(12) United States Patent
Papasakellariou

(10) Patent No.: US 11,991,696 B2
(45) Date of Patent: May 21, 2024

(54) SCHEDULING MULTIPLE DOWNLINK TRANSMISSIONS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 17/643,793

(22) Filed: Dec. 10, 2021

(65) Prior Publication Data

US 2022/0201726 A1    Jun. 23, 2022

Related U.S. Application Data

(60) Provisional application No. 63/126,745, filed on Dec. 17, 2020, provisional application No. 63/155,016, filed on Mar. 1, 2021.

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0067* (2013.01); *H04L 1/1812* (2013.01);
(Continued)

(58) Field of Classification Search
CPC ... H04W 72/04; H04W 72/12; H04W 72/044; H04W 72/20; H04W 72/23;
(Continued)

(56) References Cited

U.S. PATENT DOCUMENTS

2012/0257568 A1* 10/2012 Cai et al. .................... 370/328
2013/0117622 A1* 5/2013 Blankenship et al. ........ 714/751
(Continued)

FOREIGN PATENT DOCUMENTS

CA    3151676 A1 *  2/2021  ........... H04W 72/23
EP    3833087 A1 *  6/2021  ........... H04W 24/10

OTHER PUBLICATIONS (CN 114629606 A) >>> Method and Apparatus in a Node for Wireless Communication (see title). (Year: 2022).*
(Continued)

*Primary Examiner* — Meless N Zewdu

(57) ABSTRACT

Methods and apparatuses for scheduling multiple downlink transmissions. A method for operating a user equipment to provide hybrid automatic repeat request acknowledgement (HARQ-ACK) information includes receiving information for a first HARQ-ACK codebook type and a second HARQ-ACK codebook type and information for a first set of cells and a second set of cells. The method further includes generating a first HARQ-ACK codebook, according to the first HARQ-ACK codebook type, that includes first HARQ-ACK information associated with first receptions on cells from the first set of cells; a second HARQ-ACK codebook, according to the second HARQ-ACK codebook type, that includes second HARQ-ACK information associated with second receptions on cells from the second set of cells; and a HARQ-ACK codebook by appending the second HARQ-ACK codebook to the first HARQ-ACK codebook. The method further includes transmitting a channel that provides the HARQ-ACK codebook.

20 Claims, 18 Drawing Sheets

(51) Int. Cl.
  *H04L 1/1812* (2023.01)
  *H04L 5/00* (2006.01)
  *H04W 72/044* (2023.01)
  *H04W 72/20* (2023.01)
(52) U.S. Cl.
  CPC ......... *H04L 5/0053* (2013.01); *H04W 72/044* (2013.01); *H04W 72/20* (2023.01)
(58) Field of Classification Search
  CPC . H04W 72/542; H04W 72/543; H04W 72/54; H04W 72/231; H04L 72/1273; H04L 1/16; H04L 1/18; H04L 5/00; H04L 1/0067; H04L 1/1812; H04L 5/0053; H04L 1/1854; H04L 5/0055; H04L 5/0082; H04L 5/0098; H04L 5/0035; H04L 5/001; H04L 5/0023; H04L 1/00; H04L 1/1829; H04L 1/1822; H04L 1/0013; H04L 1/08; H04L 1/1861; H04L 1/1825; H04L 1/1864; H04L 1/1896
  See application file for complete search history.

(56) References Cited

U.S. PATENT DOCUMENTS

| | | | |
|---|---|---|---|
| 2015/0207601 A1* | 7/2015 | Kim et al. | H04L 5/0048 |
| 2018/0098345 A1 | 4/2018 | Tiirola et al. | |
| 2018/0241510 A1 | 8/2018 | Shen | |
| 2020/0007296 A1* | 1/2020 | Papasakellariou | H04L 5/0055 |
| 2020/0213044 A1* | 7/2020 | Peng et al. | H04L 1/1819 |
| 2020/0344010 A1 | 10/2020 | Lei et al. | |
| 2020/0374045 A1 | 11/2020 | Yin et al. | |
| 2021/0314105 A1* | 10/2021 | Gao et al. | H04L 1/1861 |

OTHER PUBLICATIONS (CN 114598998 A) >>> Method and Apparatus in a Node for Wireless Communication (see title). (Year: 2022).*
(CN 110535609 B) >>> Method for Determining Target Parameter, Communication Node and Storage Medium (see title). (Year: 2023).*
(JP 2023513165 A) >>> Hybrid Automatic Repeat Request Response Codebook Determining Method, Apparatus and Device Thereof (see title). (Year: 2023).*
(CN 115701014 A) >>> PDCCH HARQ-ACK Feedback Method and Apparatus (see title) (Year: 2023).*
(CN 108809534 B) >>> Scheduling Method, HARQ-ACK Feedback Method and Corresponding Device (see title). (Year: 2022).*
(WO 2021012662 A1) >>> Multipoint Transmitting Method and Device for Hybrid Automatic Repeat Request (see title). (Year: 2021).*
(WO 2019072074 A1) >>> HARQ-ACK Feedback Codebook Sending Method, Apparatus and Device (seed title). (Year: 2019).*
(CN 108289015 A) >>> Sending the HARQ-ACK/NACK Method and Device and a Downlink Transmission Method and Device (see title). (Year: 2018).*
"3rd Generation Partnership Project; Technical Specification Group Radio Access Network; NR; Physical channels and modulation (Release 16)", 3GPP TS 38.211 v16.4.0, Dec. 2020, 133 pgs.
"3rd Generation Partnership Project; Technical Specification Group Radio Access Network; NR; Multiplexing and channel coding (Release 16)", 3GPP TS 38.212 v16.4.0, Dec. 2020, 152 pgs.
"3rd Generation Partnership Project; Technical Specification Group Radio Access Network; NR; Physical layer procedures for control (Release 16)", 3GPP TS 38.213 v16.4.0, Dec. 2020, 181 pgs.
"3rd Generation Partnership Project; Technical Specification Group Radio Access Network; NR; Physical layer procedures for data (Release 16)", 3GPP TS 38.214 v16.4.0, Dec. 2020, 169 pgs.
"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.
CATT, "Correction on HARQ-ACK codebook for secondary PUCCH group", 3GPP TSG RAN WG1 Meeting #103-e, Oct. 26-Nov. 13, 2020, R1-2007807, 4 pages.
International Search Report dated Mar. 23, 2022 in connection with International Patent Application No. PCT/KR2021/019278, 3 pages.
Written Opinion of the International Searching Authority dated Mar. 23, 2022 in connection with International Patent Application No. PCT/KR2021/019278, 3 pages.

* cited by examiner

SCHEDULING MULTIPLE DOWNLINK TRANSMISSIONS

CROSS-REFERENCE TO RELATED APPLICATIONS AND CLAIM OF PRIORITY

This application claims priority under 35 U.S.C. § 119(e) to U.S. Provisional Patent Application No. 63/126,745 filed on Dec. 17, 2020, and U.S. Provisional Patent Application No. 63/155,016 filed on Mar. 1, 2021. The above-identified provisional patent applications are hereby incorporated by reference in their entirety.

TECHNICAL FIELD

The present disclosure relates generally to wireless communication systems and, more specifically, the present disclosure relates to scheduling multiple downlink transmissions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to scheduling multiple downlink transmissions.

In one embodiment, a method for providing hybrid automatic repeat request acknowledgement (HARQ-ACK) information is provided. The method includes receiving information for a first HARQ-ACK codebook type and a second HARQ-ACK codebook type and information for a first set of cells and a second set of cells. The method further includes generating a first HARQ-ACK codebook, according to the first HARQ-ACK codebook type, that includes first HARQ-ACK information associated with first receptions on cells from the first set of cells; a second HARQ-ACK codebook, according to the second HARQ-ACK codebook type, that includes second HARQ-ACK information associated with second receptions on cells from the second set of cells; and a HARQ-ACK codebook by appending the second HARQ-ACK codebook to the first HARQ-ACK codebook. The method further includes transmitting a channel that provides the HARQ-ACK codebook.

In another embodiment, a user equipment (UE) is provided. The UE includes a transceiver configured to receive information for a first HARQ-ACK codebook type and a second HARQ-ACK codebook type and information for a first set of cells and a second set of cells. The UE further includes a processor operably coupled to the transceiver. The processor is configured to generate a first HARQ-ACK codebook, according to the first HARQ-ACK codebook type, that includes first HARQ-ACK information associated with first receptions on cells from the first set of cells; a second HARQ-ACK codebook, according to the second HARQ-ACK codebook type, that includes second HARQ-ACK information associated with second receptions on cells from the second set of cells; and a HARQ-ACK codebook by appending the second HARQ-ACK codebook to the first HARQ-ACK codebook. The transceiver is further configured to transmit a channel that provides the HARQ-ACK codebook.

In yet another embodiment, a base station is provided. The base station includes a transceiver configured to transmit information for a first HARQ-ACK codebook type and a second HARQ-ACK codebook type, transmit information for a first set of cells and a second set of cells, and receive a channel that provides a HARQ-ACK codebook. The base station further includes a processor operably coupled to the transceiver. The processor is configured to identify, from the HARQ-ACK codebook: a first HARQ-ACK codebook, according to the first HARQ-ACK codebook type, that includes first HARQ-ACK information associated with first transmissions on cells from the first set of cells, and a second HARQ-ACK codebook, according to the second HARQ-ACK codebook type, that includes second HARQ-ACK information associated with second transmissions on cells from the second set of cells.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
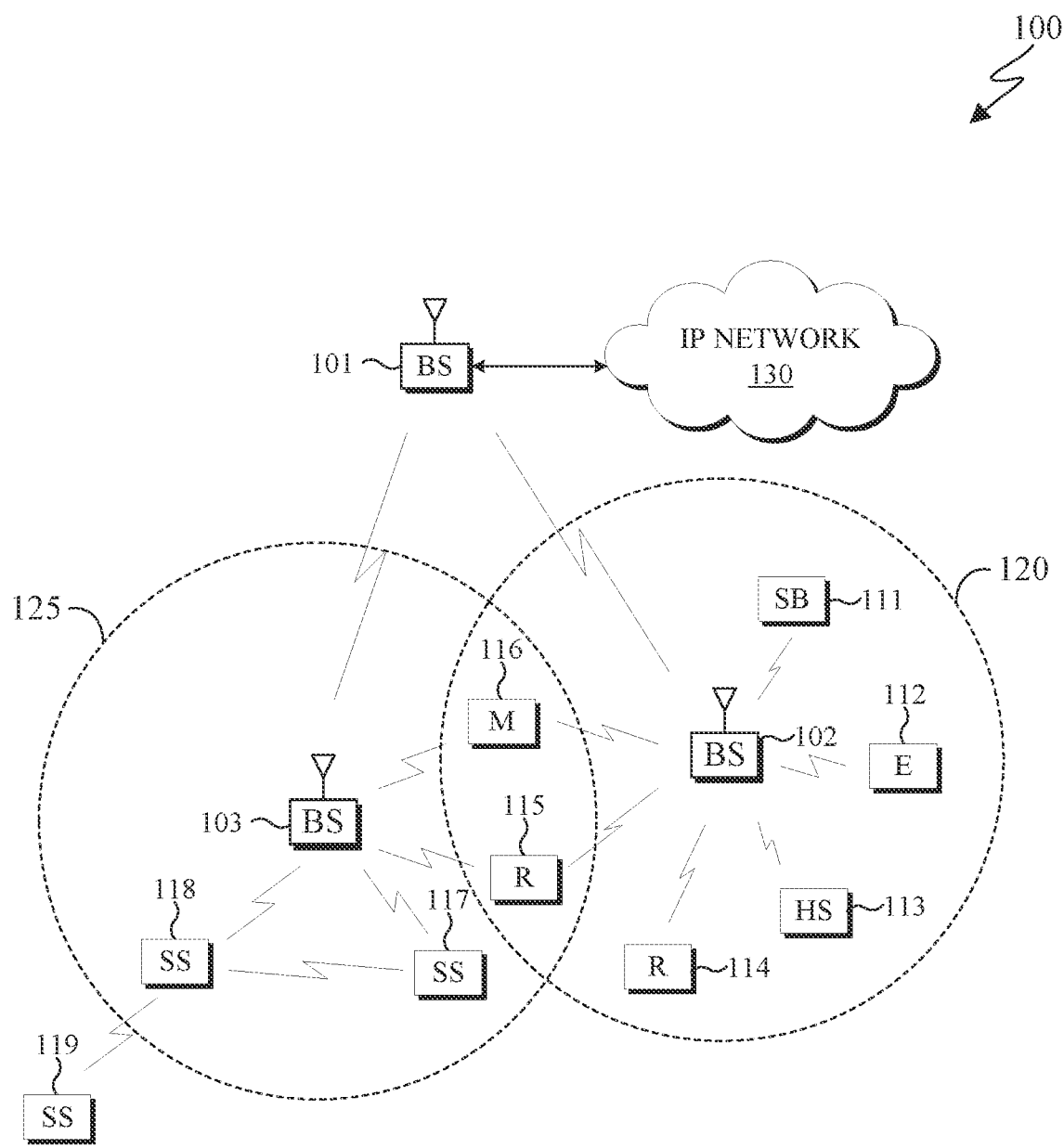
FIG. 1 illustrates an example wireless network according to embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein:

(i) 3GPP TS 38.211 v16.4.0, "NR; Physical channels and modulation;"
(ii) 3GPP TS 38.212 v16.4.0, "NR; Multiplexing and Channel coding;"
(iii) 3GPP TS 38.213 v16.4.0, "NR; Physical Layer Procedures for Control;"
(iv) 3GPP TS 38.214 v16.4.0, "NR; Physical Layer Procedures for Data;"
(v) 3GPP TS 38.321 v16.3.1, "NR; Medium Access Control (MAC) protocol specification;" and
(vi) 3GPP TS 38.331 v16.3.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Embodiments of the present disclosure relate to scheduling multiple transmissions of physical downlink shared channels (PDSCHs) from a base station to a user equipment (UE) and corresponding receptions by the UE. Embodiments of the present disclosure also relate to enhancing a reception reliability and reducing an overhead for acknowledgement information that is reported from a user equipment (UE) to a base station when the UE is configured for operation with carrier aggregation.

Figure 2:
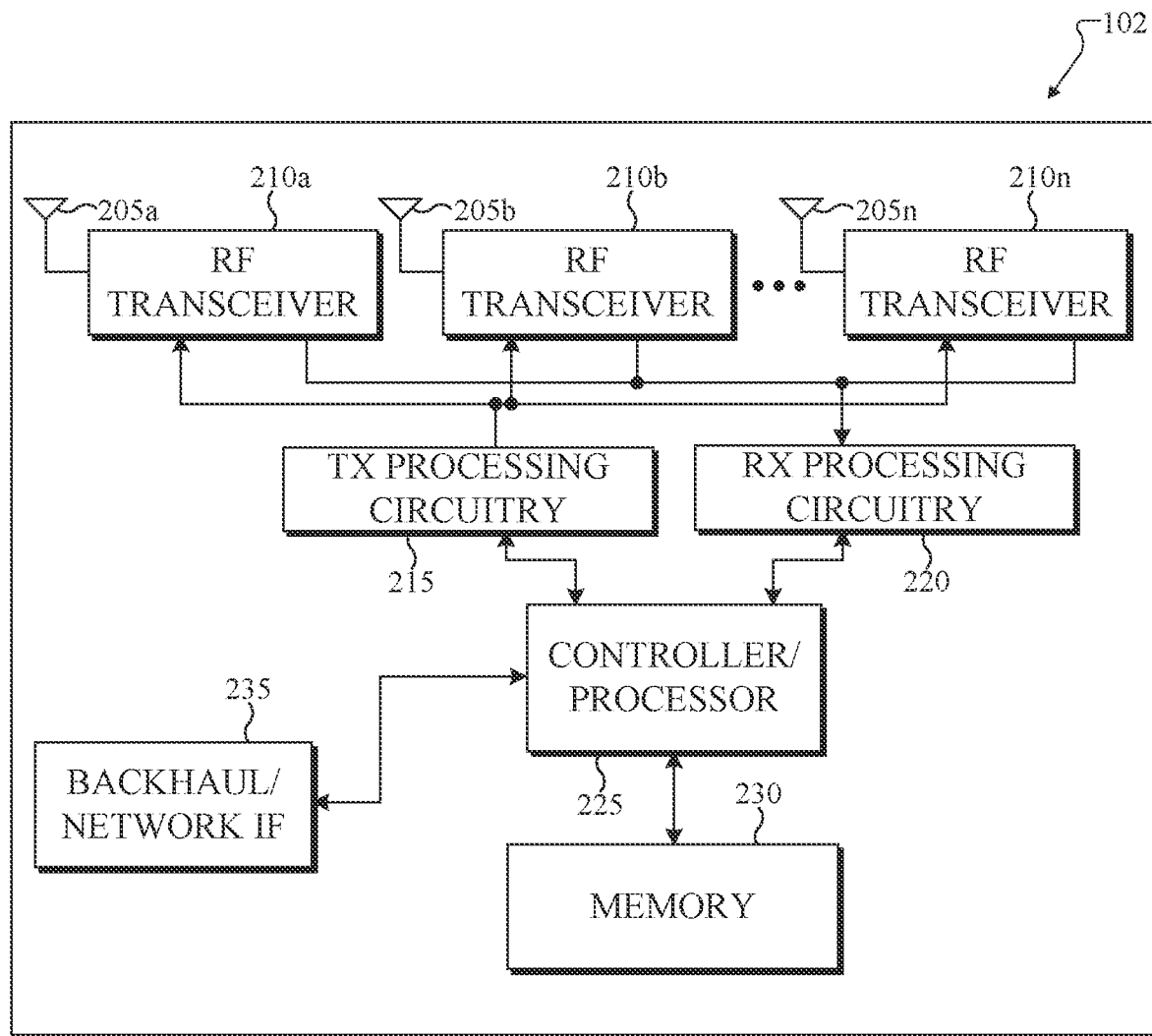
FIG. 2 illustrates an example base station (BS) according to embodiments of the present disclosure.
Figure 3:
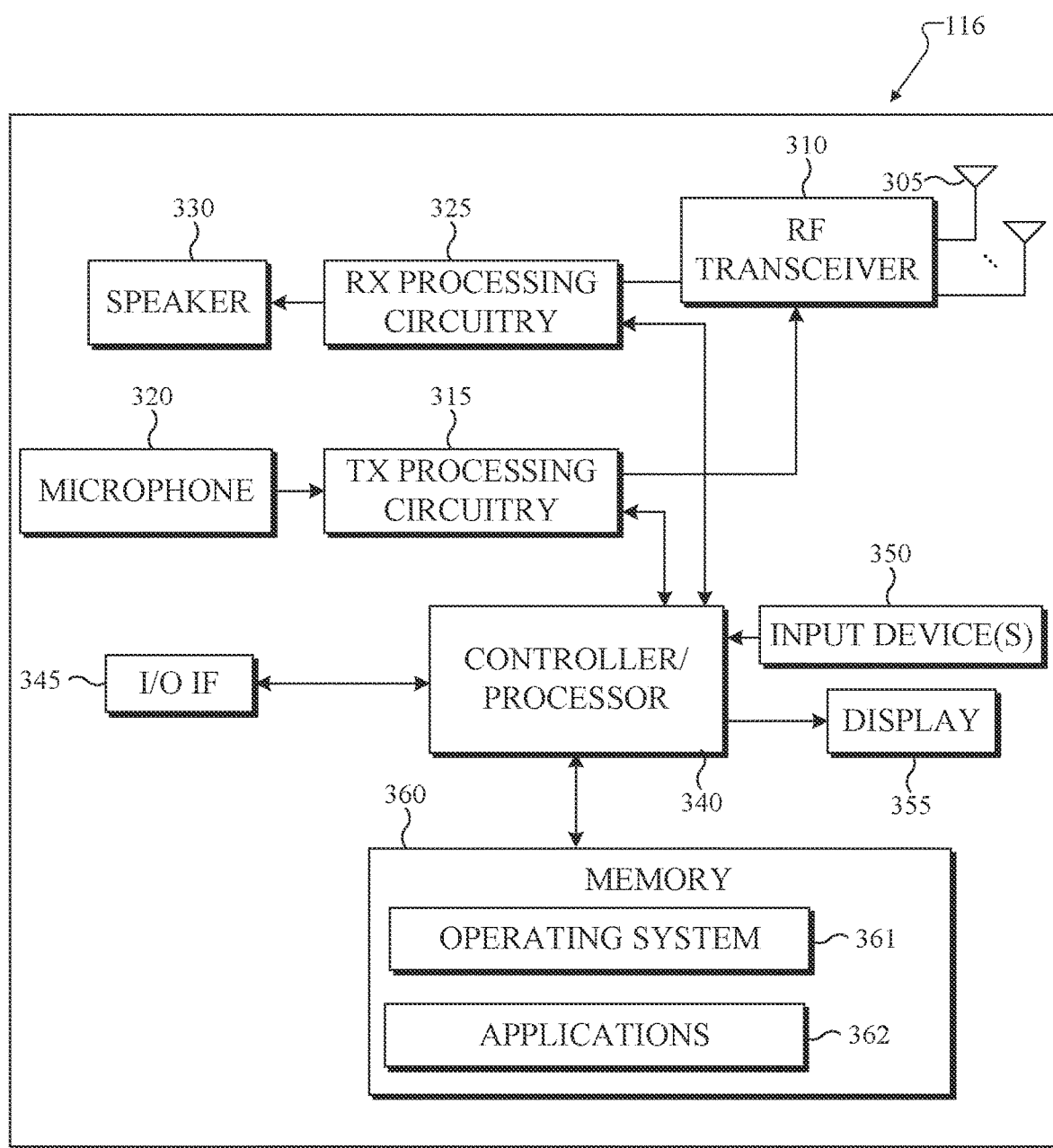
FIG. 3 illustrates an example UE according to embodiments of the present disclosure.

FIGS. 1-3 below describe various embodiments implemented in wireless communications systems. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BS s 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

As described in more detail below, one or more of the UEs 111-119 include circuitry, programming, or a combination thereof for scheduling multiple downlink transmissions and enhancing reception reliability of acknowledgment information in carrier aggregation. In certain embodiments, and one or more of the BSs 101-103 includes circuitry, programming, or a combination thereof for scheduling multiple downlink transmissions and enhancing reception reliability of acknowledgment information in carrier aggregation.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support scheduling multiple downlink transmissions and enhancing reception reliability of acknowledgment information in carrier aggregation. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports scheduling multiple downlink transmissions and enhancing reception reliability of acknowledgment information in carrier aggregation. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
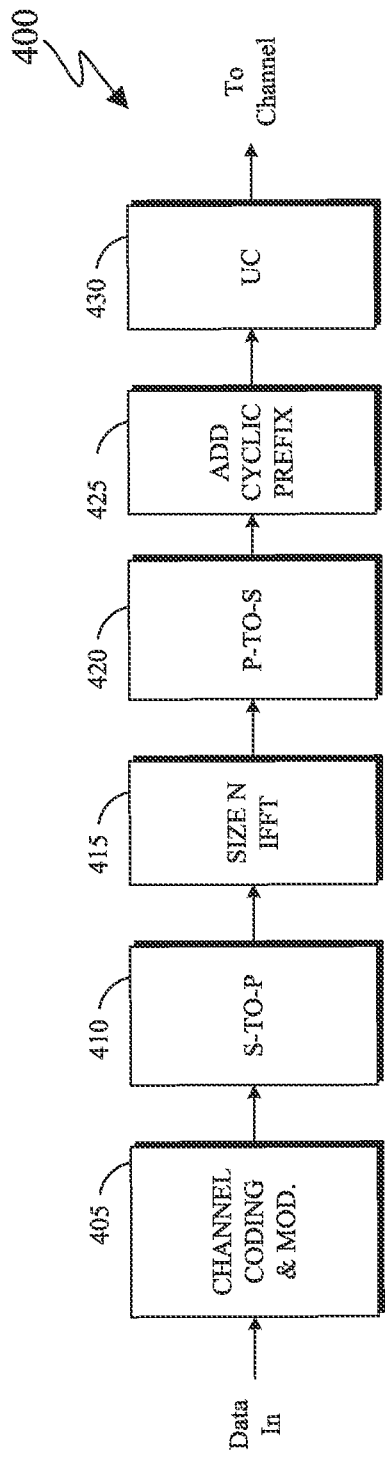
FIGS. 4 and 5 illustrate example wireless transmit and receive paths according to embodiments of the present disclosure.
Figure 5:
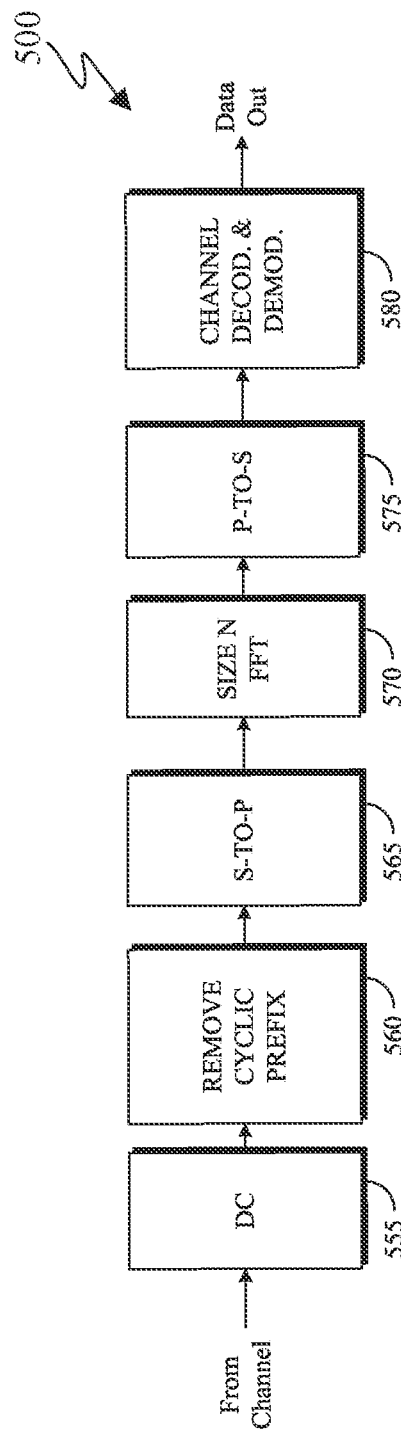

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support scheduling multiple downlink transmissions and enhancing reception reliability of acknowledgment information in carrier aggregation as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu}\cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective PDSCHs or physical DL control channels (PDCCHs). A PDSCH or a PDCCH can be transmitted over a variable number of slot symbols including one slot symbol.

A PDCCH transmission that is over a number of control channel elements (CCEs) from a predetermined set of numbers of CCEs referred to as CCE aggregation level. A PDCCH transmission that is within time-frequency resources of a control resource set (CORESET) and over a number of CCEs from a predetermined set of numbers of CCEs referred to as CCE aggregation level.

A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception.

As used herein, the term "higher layers" is used to denote control information that a UE is provided in a PDSCH reception, such as radio resource control (RRC) or a medium access control (MAC) control element (CE).

In certain embodiments, a TB transmission can be an initial one or a retransmission as identified by a new data indicator (NDI) field in the DCI format scheduling a PDSCH reception that provides a TB retransmission for a given HARQ process number. In other embodiments, a TB reception can be an initial one or a non-initial one as identified by an NDI field in the DCI format scheduling a PDSCH reception that provides the TB for a given HARQ process number. A redundancy version (RV) for the TB encoding can be indicate by a corresponding field in the DCI format.

A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as RRC signaling from a BS. A DM-RS is typically transmitted within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding reference signals (SRS) enabling a BS to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes HARQ-ACK information, indicating correct or incorrect decoding of TBs or of code block groups CBGs in a PDSCH, scheduling request (SR) indicating whether a UE has data in its buffer to transmit, and CSI reports enabling a BS to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE can also provide HARQ-ACK information for other purposes, such as for a correct decoding of each codebook block (CBG) from multiple CBGs that comprise a TB, for a DCI format indicating a SPS PDSCH release, or of a correct decoding of a DCI format indicating a dormant/non-dormant BWP for an activated cell, and so on. A UE multiplexes HARQ-ACK information in a slot indicated by a value of PDSCH-to-HARQ_feedback timing indicator field in the DCI format, from a set of slot timing values $K_1$, or indicated by higher layers in case of a SPS PDSCH reception.

In certain embodiments, UL RS includes dedicated demodulation reference signals (DMRS) and SRS. DMRS is typically transmitted within a BW of a respective PUSCH or PUCCH. A BS (such as the BS 102) can use a DMRS to demodulate information in a respective PUSCH or PUCCH. SRS is transmitted by a UE to provide a BS with an UL CSI and, for a time division duplex (TDD) system, to also provide a precoding matrix indicator (PMI) for DL transmission. Further, as part of a random access procedure or for other purposes, a UE can transmit a physical random access channel (PRACH).

DL receptions and UL transmissions by a UE can be configured to occur in a corresponding DL BWP and UL BWP. A DL/UL BWP is smaller than or equal to a DL/UL bandwidth of a serving cell. Groupcast PDSCH receptions can occur in a common frequency region for a group of UEs, wherein the common frequency region is within an active DL BWP for each UE from the group of UEs. For a DL reception or an UL transmission that is scheduled by a DCI format, a corresponding DL BWP or UL BWP can be indicated among a set of configured DL BWPs or UL BWPs by a value of a BWP indicator field in the DCI format A PDSCH reception by a UE or a PUSCH transmission from a UE can be according to a resource allocation type 0 or a resource allocation type 1. For resource allocation type 0, a DCI format scheduling the PDSCH reception or the PUSCH transmission includes a frequency domain resource allocation (FDRA) field that provides a bitmap wherein each bit of the bitmap maps to a resource block group (RBG) that include a number of RBs that is either configured by higher layer signaling or is specified in the system operation. For resource allocation type 1, the FDRA field provides a first RB and a number of RBs for the PDSCH reception or the PUSCH transmission.

For a UE configured to operate with carrier aggregation (CA), DL receptions or UL transmissions can be over multiple cells that include a primary cell and secondary cells (SCells). A DCI format scheduling a PDSCH reception can include a SCell dormancy indication field indicating whether or not an active DL BWP is a dormant BWP, wherein the UE does not receive PDCCH when a dormant BWP is the active DL BWP.

DL transmissions from a BS and UL transmissions from a UE can be based on an orthogonal frequency division multiplexing (OFDM) waveform including a variant using DFT precoding that is known as DFT-spread-OFDM.

Figure 6:
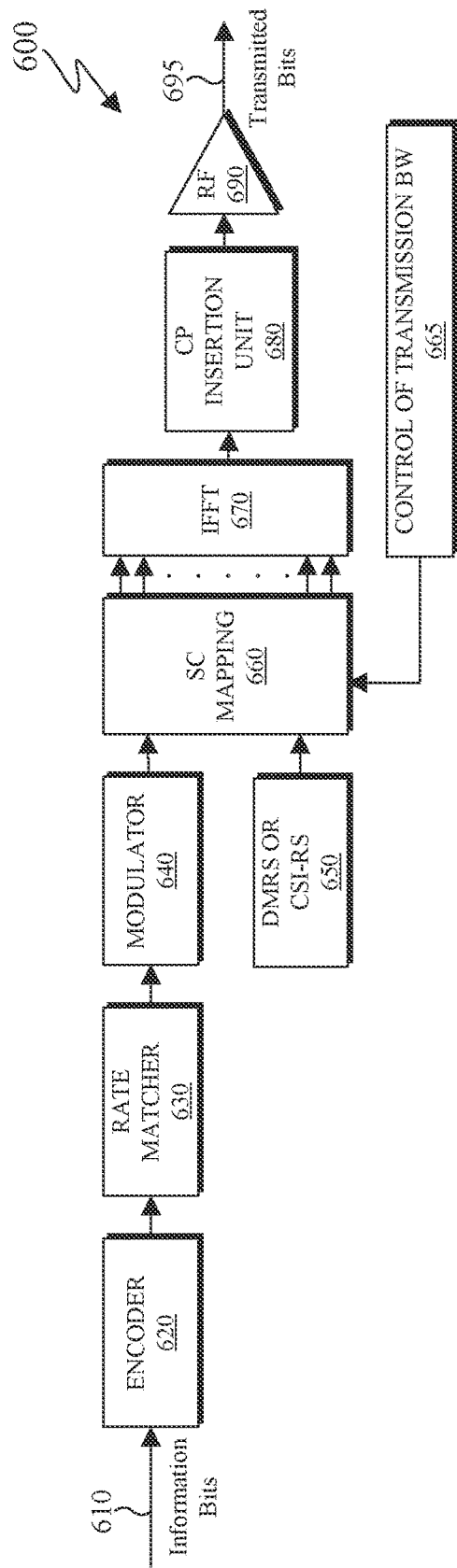
FIG. 6 illustrates a block diagram of an example transmitter structure using orthogonal frequency division multiplexing (OFDM) according to embodiments of the present disclosure.
Figure 7:
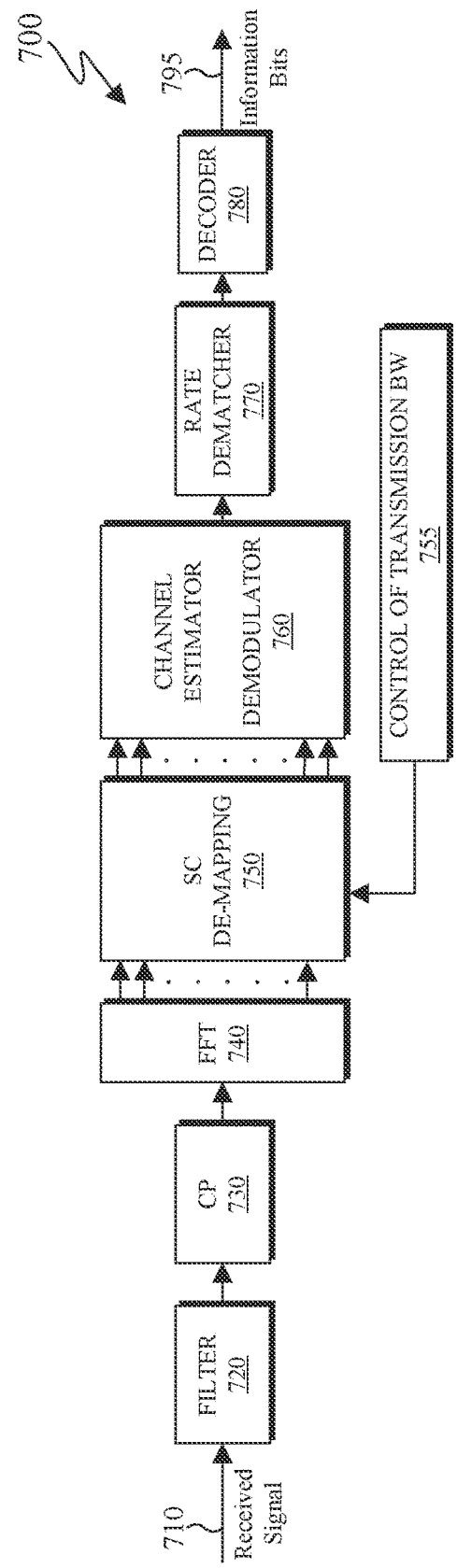
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) receives multiple PDCCH candidates over corresponding CCE aggregation levels to decode multiple DCI formats in a slot.

In certain embodiments, a UE (such as the UE 116) monitors multiple candidate locations for respective potential PDCCH receptions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits.

For a DCI format scheduling a PDSCH or a PUSCH to a single UE (such as the UE 116), the RNTI can be (i) a cell RNTI (C-RNTI), (ii) a configured scheduling RNTI (CS-RNTI), or (iii) a modulation and coding scheme (MCS)-C-RNTI and serves as a UE identifier. In the following, for brevity, only the C-RNTI will be referred to when needed. A UE can receive/monitor PDCCH for detections of DCI formats with CRC scrambled by a C-RNTI according to a UE-specific search space (USS). For DCI format 0_0 and DCI format 1_0 that schedule PUSCH transmissions and PDSCH receptions, respectively, to a UE, the UE can additionally be configured to monitor corresponding PDCCH according to common search space (CSS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type-3-PDCCH CSS.

Figure 8:
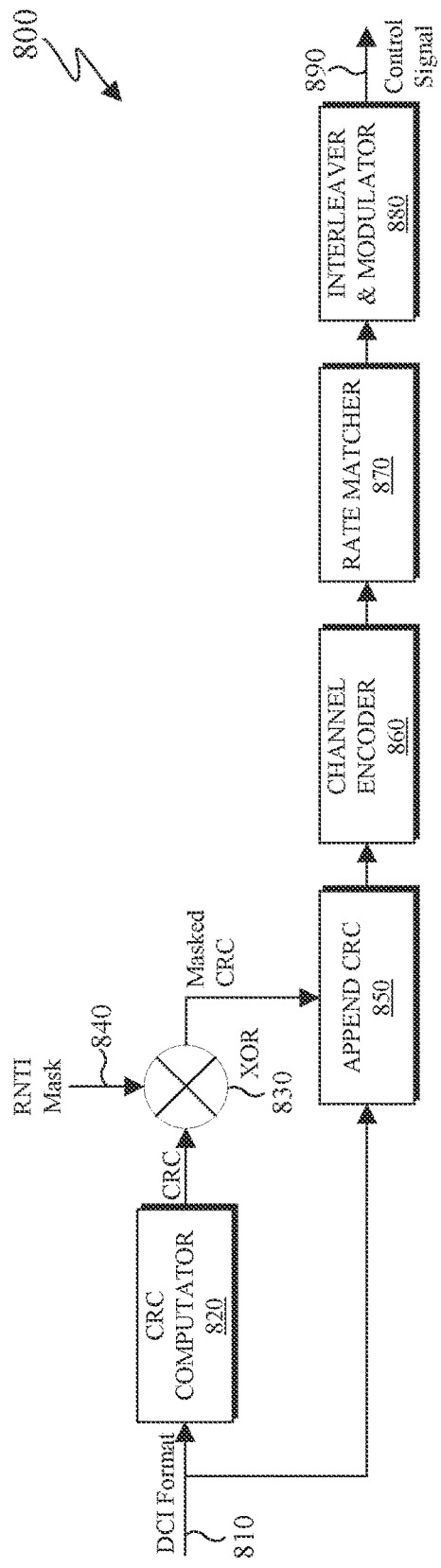
FIG. 8 illustrates an example encoding process for a downlink control information (DCI) format according to embodiments of the present disclosure.
Figure 9:
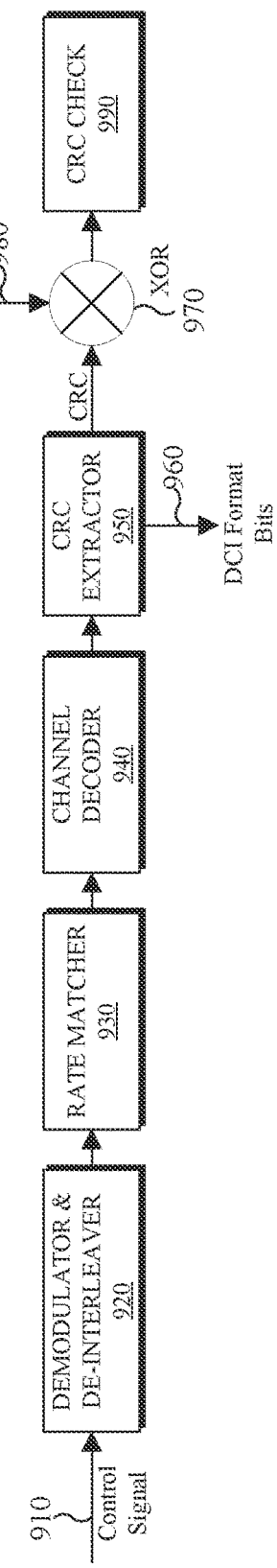
FIG. 9 illustrates an example decoding process for a DCI format for use with a UE according to embodiments of the present disclosure.

FIG. 8 illustrates an example encoding process 800 for a DCI format according to embodiments of the present disclosure. FIG. 9 illustrates an example decoding process 900 for a DCI format for use with a UE according to embodiments of the present disclosure. The encoding process 800 of FIG. 8 and the decoding process 900 of FIG. 9 are for illustration only and other embodiments can be used without departing from the scope of the present disclosure.

A BS separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format.

As illustrated in FIG. 8, the CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

As illustrated in FIG. 9, a received control signal 910 is demodulated and de-interleaved by a demodulator and a de-interleaver 920. A rate matching applied at a BS transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

A UE (such as the UE 116) can support a predetermined number of HARQ processes. For example, a UE can support 16 HARQ processes. The number of supported HARQ processes can be a requirement or a capability that the UE reports to a serving gNB.

A UE (such as the UE 116) can be configured for operation with CA over a number of serving cells that include a primary cell and a number of SCells. At a given time, an SCell can be activated or deactivated. For an activated SCell, the UE can be configured a number of DL bandwidth parts (BWPs) that can include a dormant DL BWP (and the remaining DL BWPs are non-dormant ones). A UE can receive PDSCHs only on activated SCells and only on a non-dormant active DL BWP of an activated SCell.

A UE can configure a HARQ-ACK codebook type to provide HARQ-ACK information in response to decoding outcomes of DCI formats in PDCCH receptions or of TBs in PDSCH receptions. The HARQ-ACK codebook can be a Type-1 HARQ-ACK codebook, a Type-2 HARQ-ACK codebook including a possible grouping of two Type-2 HARQ-ACK codebook, or a Type-3 HARQ-ACK codebook. Among those HARQ-ACK codebooks, the Type-2 HARQ-ACK codebook avoids introducing redundant HARQ-ACK information in the codebook, such as HARQ-ACK information that does not relate to an actual DCI format decoding outcome or TB decoding outcome, and therefore results to a smallest HARQ-ACK codebook size. The smaller size is effective in minimizing an overhead associated with HARQ-ACK information reports and maximizing a corresponding reception reliability.

A construction of a Type-2 HARQ-ACK codebook requires that a gNB (such as the BS 102) orders, in ascending order of a start time, PDCCH transmissions that provide DCI formats associated HARQ-ACK information and, in case of a same start time, the PDCCH transmissions are order according to an ascending order of a cell index where a corresponding PDSCH transmission is scheduled. That ordering is reflected by a value of a downlink assignment index (DAI) field that is included in the DCI formats scheduling the PDSCH transmissions. In that manner, a UE generates HARQ-ACK information only for DCI formats in PDCCH transmissions that are associated with HARQ-ACK information based on correct decoding of such DCI formats and identification of DCI formats that were incorrectly decoded based on the values of the DAI field in correctly decoded DCI formats.

The intrinsic requirement for a Type-2 HARQ-ACK codebook to be functional is that a serving gNB can properly set the value of the DAI field in each applicable DCI format in order to properly reflect the aforementioned ordering of PDCCH transmissions. However, in practice, such as when schedulers for PDSCH transmissions on different cells do not operate in a coordinated manner, the serving gNB may not be able to properly set the values of DAI fields. In such cases, the gNB can configure a UE to provide a Type-1 HARQ-ACK codebook or a Type-3 HARQ-ACK codebook. The construction of a Type-1 HARQ-ACK codebook depends on parameters that are configured by higher layers and is therefore independent of a dynamic ordering of PDCCH transmissions associated with HARQ-ACK information. The drawback is a large amount of redundant HARQ-ACK information that can be generated, particularly for CA operation with multiple configured cells in unpaired spectrum. For example, a number of HARQ-ACK information bits corresponding to actual PDCCH/PDSCH transmissions can be four while a number of HARQ-ACK information bits in a Type-1 HARQ-ACK codebook can be in the tens or even hundreds. The construction of a Type-3 HARQ-ACK codebook relies on a DCI format indicating a number of HARQ processes and a number of cells for the UE to provide corresponding HARQ-ACK information. In terms of operational characteristics for a resulting efficiency, the Type-3 HARQ-ACK codebook is between the Type-2 HARQ-ACK codebook and the Type-1 HARQ-ACK codebook as it requires more/less coordination among schedulers for different cells than the Type-1/Type-2 HARQ-ACK codebooks, respectively, while typically resulting to a smaller/larger size than the Type-1/Type-2 HARQ-ACK codebooks, respectively, as due to a limited size of information that can be provided by a DCI format, the granularity for indicating HARQ processes and cells for the UE to provide HARQ-ACK information is coarse thereby resulting to reporting of redundant HARQ-ACK information.

A DCI format scheduling a PUSCH transmission from a UE can include a DAI field. Here, the DAI field comprises (i) one bit when the UE is configured to provide a Type-1 HARQ-ACK codebook, (ii) one or two bits when the UE is configured to provide only a Type-2 HARQ-ACK codebook for TB receptions, and (iii) two or four bits when the UE is configured to provide a first Type-2 HARQ-ACK codebook for TB receptions and a second Type-2 HARQ-ACK codebook for CBG receptions. It is noted that the first/last one or two bits are for the first/second Type-2 HARQ-ACK codebook. The UE can provide HARQ-ACK information for a SPS PDSCH release or for SPS PDSCH receptions.

In certain network deployments, a serving gNB (such as the BS 102) can provide a proper setting for values of DAI field in DCI format associated with corresponding HARQ-ACK information reports from a UE at least for a group of cells. For example, when a scheduling cell schedules PDSCH transmission to the UE on multiple scheduled cells, the scheduler can properly set the values of a DAI fields in corresponding DCI formats scheduling the PDSCH transmissions. In such deployments it is detrimental to configure to a UE to report HARQ-ACK information according to a Type-1 HARQ-ACK codebook only because there may be a few scheduled cells that a serving gNB cannot properly set values of a DAI field in DCI formats associated with HARQ-ACK information from the UE.

For a Type-3 HARQ-ACK codebook, a UE (such as the UE 116) provides HARQ-ACK information bits for TBs associated with all HARQ processes across all configured serving cells. When a maximum number of TBs that can be received in a PDSCH on a cell is two and the UE is not configured for spatial domain bundling in generating HARQ-ACK information bits, the UE provides HARQ-ACK information bits for two TBs per HARQ process for the cell. The UE can be configured to additionally provide a value of an NDI field that was indicated in a DCI format corresponding to HARQ-ACK information bits for a TB of a HARQ process on a serving cell. Then, for example, for sixteen HARQ processes, eight serving cells, a maximum of two TBs in a PDSCH per cell, and without indication of an NDI value, a number of HARQ-ACK information bits in a Type-3 HARQ-ACK codebook is 256. That number further increases when the UE is configured to report HARQ-ACK information for multiple CBGs per TB on a cell.

Therefore, embodiments of the present disclosure take into consideration that there is a need to define a procedure for HARQ-ACK information reporting according to multiple Type-2 HARQ-ACK codebooks corresponding to multiple groups of cells, or according to a Type-1 HARQ-ACK codebook for a first group/set of cells and one or more Type-2 HARQ-ACK codebooks for respective one or more second groups/sets of cells. Embodiments of the present disclosure also take into consideration that there is a need to reduce a size of a Type-1 HARQ-ACK codebook. Embodiments of the present disclosure further take into consideration that there is a need to increase a granularity for reporting HARQ-ACK information with a Type-3 HARQ-ACK codebook.

Figure 10:
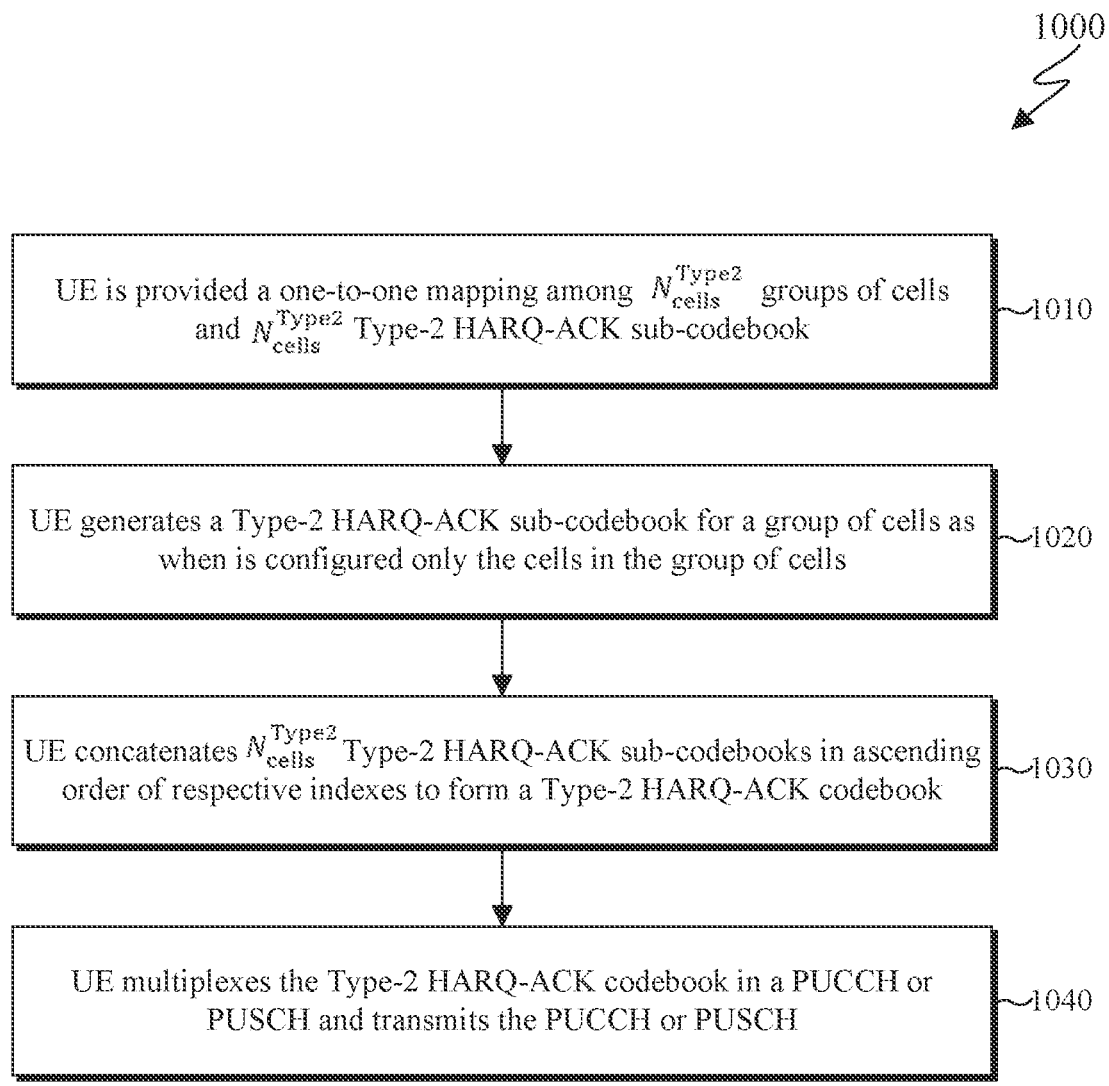
FIG. 10 illustrates an example method for a configuration of a number of cell groups associated with a corresponding number of Type-2 sub-codebooks that include a Type-2 codebook according to embodiments of the present disclosure.
Figure 11:
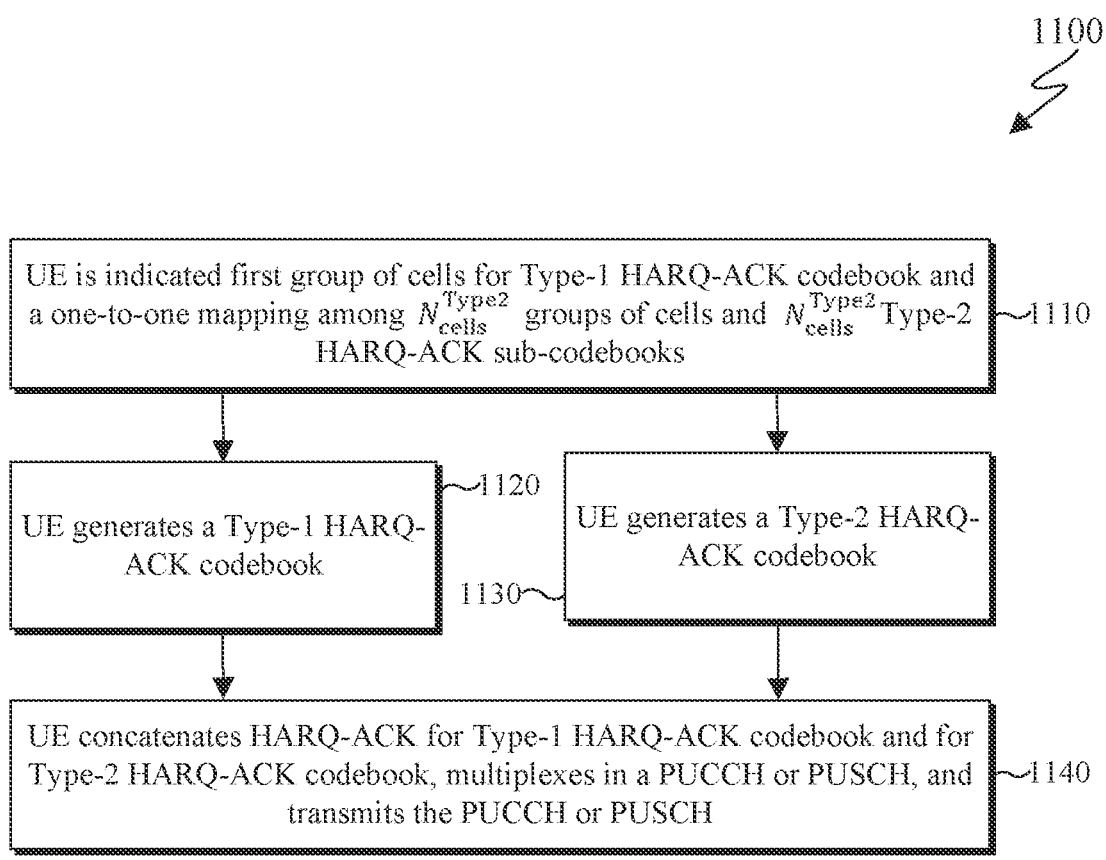
FIG. 11 illustrates an example method for HARQ-ACK reporting using a combination of Type-1 HARQ-ACK codebook and a Type-2 HARQ-ACK codebook according to embodiments of the present disclosure.

Accordingly, embodiments of the present disclosure, such as those regarding FIGS. 10 and 11, describe a procedure for HARQ-ACK information reporting according to multiple Type-2 HARQ-ACK codebooks corresponding to multiple groups/sets of cells, or according to a Type-1 HARQ-ACK codebook for a first group/set of cells and one or more Type-2 HARQ-ACK codebooks for respective one or more second groups/sets of cells. Embodiments of the present disclosure, such as those regarding FIGS. 12 and 13, relate to reducing a size of a Type-1 HARQ-ACK codebook. Embodiments of the present disclosure, such as those regarding FIG. 14, relate to increasing a granularity for reporting HARQ-ACK information with a Type-3 HARQ-ACK codebook.

In certain embodiments, a PDCCH transmission represents overhead and decreases a spectral efficiency. Moreover, for shared spectrum operation, having individual PDCCH transmissions schedule corresponding PUSCH transmissions can be inefficient due to the requirement by the gNB and the UE to perform a "listen before talk" (LBT) prior to each respective transmission. To alleviate those shortcomings for scheduled transmissions, a single DCI format provided by a single PDCCH transmission can be used to scheduled multiple PDSCH transmissions from a gNB (such as the BS 102) or multiple PUSCH transmissions from the UE (such as the UE 116).

For PUSCH transmissions, the UE (such as the UE 116) can be provided by higher layers a time domain resource allocation (TDRA) table, wherein entries of the TDRA table include a number of PUSCH transmissions over a corresponding number of slots. For example, the TDRA table can include a first entry corresponding to a PUSCH transmission over symbols of one slot, a second entry corresponding to two PUSCH transmissions over symbols of first and second slots, respectively, a third entry corresponding to four PUSCH transmissions over symbols of a first, second, third, and fourth slots, respectively, and so on. A TDRA field in the DCI format scheduling PUSCH transmissions indicates an entry of the TDRA table and the UE determines a number of PUSCH transmissions and corresponding symbols in a respective number of slots. Each PUSCH transmission is over same RBs as indicated by a frequency domain resource allocation (FDRA) field in the DCI format. Also, for each PUSCH transmission, a MCS field in the DCI format indicates a same MCS for the encoded and modulated symbols of a corresponding TB.

In certain embodiments, a HARQ process number (HPN) provided by a corresponding field in the DCI format applies for the TB of the first PUSCH transmission and the HPN is incremented by one for a TB of each subsequent PUSCH transmission modulo the maximum number of HARQ processes. For example, if a maximum number of HARQ processes is sixteen and the DCI format schedules four PDSCH transmissions and indicates a HPN of fourteen for a first TB in the first PUSCH transmission, a second/third/fourth TB in the second/third/fourth PUSCH transmission has HPN of fifteen/zero/one, respectively. The DCI format includes a separate RV field, when provided, and a separate NDI field for a TB in each PUSCH transmission. In order for a UE to know a DCI format size prior to decoding, the number of separate NDI fields and RV fields is equal to the maximum number of PUSCH transmissions that can be scheduled by the DCI format as determined by the entries of the TDRA table.

A similar approach can apply for scheduling multiple PDSCH receptions by a UE (such as the UE 116) using one DCI format. The UE can be provided by higher layers a TDRA table with entries indicating corresponding numbers of PDSCH receptions and a value of a TDRA field in the DCI format indicates an entry from the TDRA table. A same value of a FDRA field can apply for determining RBs for all PDSCH receptions and a same value of a MCS field can apply for determining a MCS of all corresponding TBs. A HPN field can indicate a HPN for a first TB in a first PDSCH reception and a HPN for remaining TBs can be determined by sequentially increasing the HPN for the first TB modulo the maximum number of HARQ processes. Also, a RV field and an NDI field can be included for each of the maximum number of PDSCH receptions.

It is noted that there are several additional aspects to consider for scheduling multiple PDSCH receptions by a single DCI format. A first aspect relates to a construction of a HARQ-ACK information report in response to decoding outcomes for TBs in multiple PDSCH receptions that are scheduled by a same DCI format and to a determination of a PUCCH resource and of a slot for a transmission of a PUCCH with the HARQ-ACK information report. The HARQ-ACK information report can be based on one of several codebook types such as a Type-1 HARQ-ACK codebook or a Type-2 HARQ-ACK codebook.

A Type-2 HARQ-ACK codebook can be generated based on DAI field included in DCI formats scheduling PDSCH receptions. The DCI formats can also serve other purposes, such as SPS PDSCH release or SCell dormancy indication without scheduling PDSCH reception, as described in TS 38.213 v16.4.0, that are not further explicitly mentioned for brevity. The DAI field includes a counter DAI that provides an index for DCI format (or for the PDSCH reception) on a serving cell at a PDCCH monitoring occasion and a total DAI field that provides a total number of DCI formats (or PDSCH receptions) across all serving cells at the PDCCH monitoring occasion.

If a UE is configured to receive CBG based PDSCH, the DCI format includes a CBG transmission information (CBGTI) field. For an initial transmission of a TB, as indicated by the NDI field, the UE may assume that all CBGs of the TB are present. For a retransmission of a TB, as indicated by the NDI field, the CBGTI field indicates CBGs of the TB that are present in the PDSCH reception where, for example, a bit value of '0' indicates that a corresponding CBG is not transmitted and a bit value of '1' indicates that a corresponding CBG is transmitted. In case the PDSCH provides two TBs, the first half bits of the CBGTI field are for the first TB and the second half bits are for the second TB. A CBG contains similar code blocks (CBs) as in the initial transmission of the TB. The DCI format can also include a CBG flushing out information (CBGFI) field of one bit where a value of '0' indicates that earlier received instances of CBGs may be corrupted and can be discarded by the UE and a value of '1' indicates that the UE can combine the CBGs with earlier received CBGs for the TB.

A second aspect (for consideration regarding scheduling multiple PDSCH receptions by a single DCI format) relates to a first DCI format used for scheduling one PDSCH reception and a second DCI format used for scheduling more than one PDSCH receptions. Using a same DCI format both for scheduling one and more than one PDSCH reception can be inefficient as a size of the first DCI format can be materially smaller than a size of the second DCI format. Further, certain functionalities that are not used for every PDSCH reception may not be necessary to provide both by the first DCI format and by the second DCI format and a corresponding overhead can be avoided for one of the two DCI formats.

A third aspect (for consideration regarding scheduling multiple PDSCH receptions by a single DCI format) relates to determining rate matching parameters in each slot for each corresponding PDSCH reception from the multiple PDSCH receptions that are scheduled by a same DCI format. As the PDSCH receptions are over multiple slots, the DCI format scheduling the PDSCH receptions needs to provide a rate matching indicator for each slot from the multiple slots. Additionally, a UE needs to rate match/drop a PDSCH reception in a slot based on a corresponding TDD UL-DL configuration that is provided to the UE by higher layers or indicated to the UE by a DCI format such as DCI format 2_0. For a PDSCH reception that is scheduled over a single slot, a UE always receives the PDSCH as described in TS 38.213 v16.4.0, because PDSCH reception over symbols that include UL symbols can be avoided by the scheduler while that cannot be guaranteed for PDSCH receptions scheduled over multiple consecutive slots as one or more of those slots can include a larger number of UL symbols including having only UL symbols.

Therefore, embodiments of the present disclosure take into consideration that there is a need to determine a HARQ-ACK codebook in response to multiple PDSCH receptions that are scheduled by a single DCI format and parameters for a PUCCH transmission with the HARQ-ACK codebook. Embodiments of the present disclosure also take into consideration that there is a need to enable use of different DCI formats for scheduling one PDSCH reception and for scheduling more than one PDSCH receptions. Embodiments of the present disclosure further take into consideration that there is a need to determine a rate matching for each PDSCH reception from multiple PDSCH receptions that are scheduled by a DCI format.

Accordingly, embodiments of the present disclosure, such as those regarding FIGS. 15-19 relate to determining a HARQ-ACK codebook in response to multiple PDSCH receptions that are scheduled by a single DCI format and parameters for a PUCCH transmission with the HARQ-ACK codebook. Embodiments of the present disclosure, such as those regarding FIG. 20, relate to enabling use of different DCI formats for scheduling one PDSCH reception and for scheduling more than one PDSCH receptions. Embodiments of the present disclosure, such as those regarding FIG. 21, relate to determining a rate matching for each PDSCH reception from multiple PDSCH receptions that are scheduled by a DCI format.

In the following (such as in the descriptions of FIGS. 10-14), reference to HARQ-ACK information associated with DCI formats scheduling PDSCH receptions is typically with respect to PDSCH receptions but can also be for reception of a SPS PDSCH release or for a DCI format with CRC scrambled by a RNTI associated with scheduling a PDSCH reception that instead indicates dormant/non-dormant active DL BWPs for the UE in a group of cells without scheduling a PDSCH reception, and the like.

Embodiments of the present disclosure describe generating a HARQ-ACK codebook by combining Type-1 and/or Type-2 sub-codebooks. The following examples and embodiments, such as those of FIGS. 10 and 11 describe generating a HARQ-ACK codebook. For example, embodiments of this disclosure describe a procedure for a serving gNB to configure to a UE and for the UE to report HARQ-ACK information according to multiple Type-2 HARQ-ACK codebooks corresponding to multiple groups/sets of cells, or according to a Type-1 HARQ-ACK codebook for a first group/set of cells and one or more Type-2 HARQ-ACK codebooks for respective one or more second groups/sets of cells.

FIG. 10 illustrates an example method 1000 for a configuration of a number of cell groups associated with a corresponding number of Type-2 sub-codebooks that include a Type-2 codebook according to embodiments of the present disclosure. FIG. 11 illustrates an example method 1100 for HARQ-ACK reporting using a combination of Type-1 HARQ-ACK codebook and a Type-2 HARQ-ACK codebook according to embodiments of the present disclosure. The steps of the method 1000 and the method 1100 can be performed by any of the UEs 111-119 of FIG. 1, such as the UE 116 of FIG. 3. The methods 1000 and 1100 are for illustration only and other embodiments can be used without departing from the scope of the present disclosure.

In certain embodiments, a gNB (such as BS 102) determines groups/sets of cells where the gNB can set values of a DAI field in DCI formats included in PDCCH transmissions with corresponding HARQ-ACK information according to an ascending order of the PDCCH transmissions. For example, the ascending order of the PDCCH transmissions can be a corresponding ascending order of a start time of a PDCCH transmission and, in case of a same start time for multiple PDCCH transmissions, according to an ascending order of indexed for cells that are associated with the multiple PDCCH transmission, such as scheduled cells with PDSCH transmissions scheduled by DCI formats in the PDCCH transmissions.

A UE (such as the UE 116) can be configured to generate Type-2 HARQ-ACK sub-codebooks for respective group/set of cells wherein each Type-2 HARQ-ACK sub-codebook corresponds to a group/set of cells. For example, a scheduler can coordinate a setting of values for a DAI field in DCI formats scheduling PDSCH receptions on cells in a first group/set of cells and in a second group/set of cells but cannot coordinate a setting of values of a DAI field in DCI formats scheduling PDSCH receptions on cells from the first group of cells and on cells from the second group of cells. For instance, a first group/set of cells can be scheduled cells that are associated with a first scheduling cell and a second group/set of cells can be scheduled cells that are associated with a second scheduling cell. The configuration can include the indexes of serving cells with corresponding HARQ-ACK information, such as for decoding outcomes of TBs provided by PDSCH receptions in the serving cells, that is included in a same Type-2 HARQ-ACK sub-codebook.

For example, for two Type-2 HARQ-ACK sub-codebooks and eight cells, a configuration can map a first group of cells {cell#0,cell#1,cell#5,cell#7} to a first Type-2 HARQ-ACK sub-codebook and map a second group of cells {cell#2, cell#3,cell#4,cell#6} to a second Type-2 HARQ-ACK sub-codebook. For example, cell#0 can be a scheduling cell for scheduled cells {cell#0,cell#1,cell#5,cell#7} and cell#2 can be a scheduling cell for scheduled cells {cell#2, cell#3, cell#4,cell#6}. The first and second Type-2 HARQ-ACK sub-codebook can be separately generated for the first group of cells and for the second group of cells.

In certain embodiments, the UE configures $N_{cells}^{Type2}$ groups of cells wherein a cell can be assigned to one or more groups of cells. The UE can generate a Type-2 HARQ-ACK sub-codebook for a group of cells in a same manner as when the UE is configured for CA operation only on cells from the group of cells. A Type-2 HARQ-ACK sub-codebook can include either or both of TB-based HARQ-ACK information and CBG-based HARQ-ACK information. For example, values of a DAI field in DCI formats scheduling PDSCH receptions in a group of cells are incremented by only considering the cells in the group of cells. The UE can form the Type-2 HARQ-ACK codebook by concatenating the $N_{cells}^{Type2}$ HARQ-ACK sub-codebooks in an ascending order of a HARQ-ACK sub-codebook index or of a cell group index. When the UE does not receive any PDCCH that is associated with HARQ-ACK information for a group of cells, or when the UE is indicated either by higher layers or by all DCI formats associated with a Type-2 HARQ-ACK sub-codebook to not provide associated HARQ-ACK information, the UE does not generate the corresponding Type-2 HARQ-ACK sub-codebook.

The method 1000 of FIG. 10, describes a procedure for a configuration of a number of cell groups associated with a corresponding number of Type-2 sub-codebooks that comprise a Type-2 codebook according to this disclosure.

In step 1010, a UE (such as the UE 116) is configured to operate with CA over a set of serving cells is provided a one-to-one mapping among $N_{cells}^{Type2}$ groups of cells from the set of cells (including the cells in each group of cells) and $N_{cells}^{Type2}$ Type-2 HARQ-ACK sub-codebooks.

In step 1020, the UE receives a number of PDCCHs that are associated with HARQ-ACK information for a group of cells and generates a corresponding Type-2 HARQ-ACK sub-codebook for the group of cells in a same manner as when the UE is configured as serving cells only the cells in the group of cells.

In step 1030, the UE forms a Type-2 codebook by concatenating the $N_{cells}^{Type2}$ Type-2 HARQ-ACK sub-codebooks in an ascending order of corresponding indexes (or, equivalently, in an ascending order of cell group indexes).

In step 1040, the UE multiplexes the Type-2 HARQ-ACK codebook in a PUCCH or a PUSCH and transmits the PUCCH or the PUSCH.

In certain embodiments, a maximum number of Type-2 sub-codebooks is equal to a number of configured serving cells when schedulers cannot coordinate setting values of a DAI field in DCI formats associated with the serving cells, such as DCI formats scheduling PDSCH transmissions on the serving cells. For example, that scenario can occur when all serving cells are activated and each scheduled cell is also a scheduling cell (self-scheduling for each cell). Although generation and concatenation of a Type-2 HARQ-ACK sub-codebook for each serving cell remains a functional approach, the reliability of a resulting Type-2 HARQ-ACK codebook is reduced as when a UE fails to correctly decode a last DCI format associated with HARQ-ACK information for any of the serving cells, the UE incorrectly computes a size of a resulting Type-2 HARQ-ACK sub-codebook and then a serving gNB and the UE have a different understanding of a size of a Type-2 HARQ-ACK codebook, thereby resulting to an incorrect decoding of the Type-2 HARQ-ACK codebook by the gNB. That effect can be mitigated by configuring to a UE a group of cells for the UE to generate a corresponding Type-1 HARQ-ACK codebook while also configuring to the UE $N_{cells}^{Type2}$ groups of cells for the UE to generate $N_{cells}^{Type2}$ Type-2 HARQ-ACK sub-codebooks.

A UE can be provided by higher layers a first group of cells for the UE to generate a Type-1 HARQ-ACK codebook and $N_{cells}^{Type2}$ groups of cells for the UE to generate $N_{cells}^{Type2}$ Type-2 HARQ-ACK sub-codebooks. The UE can generate the Type-1 HARQ-ACK codebook for the first group of cells in a same manner as when the UE is configured only the cells in the first group of cells for CA operation. Under certain conditions of a single PDCCH reception or of only SPS PDSCH receptions, for cells from the first group of cells, the UE generates HARQ-ACK information only for the single PDCCH reception or only for SPS PDSCH receptions without generating a Type-1 HARQ-ACK codebook. For brevity of the present descriptions, such HARQ-ACK information is not differentiated from a Type-1 HARQ-ACK codebook for the first group of cells. Also, as previously described, the UE generates Type-2 HARQ-ACK sub-codebooks and forms the Type-2 HARQ-ACK codebook for the $N_{cells}^{Type2}$ groups of cells in a same manner as when the UE is configured only the cells in the $N_{cells}^{Type2}$ groups of cells for CA operation.

The method 1100 of FIG. 11, describes a procedure for HARQ-ACK reporting using a combination of a Type-1 HARQ-ACK codebook and a Type-2 HARQ-ACK codebook.

In step 1110, a UE (such as the UE 116) is configured to operate with CA over a set of serving cells is indicated by higher layers a first group of cells from the set of serving cells for generation of a Type-1 HARQ-ACK codebook and a one-to-one mapping among $N_{cells}^{Type2}$ groups of cells from the set of serving cells (including the serving cells in each group of cells) and $N_{cells}^{Type2}$ Type-2 Type-2 HARQ-ACK sub-codebooks.

In step 1120, the UE generates a Type-1 HARQ-ACK codebook. When the UE does not receive and PDCCHs or any SPS PDSCHs associated with cells from the first group of cells that the UE would report respective HARQ-ACK information in a PUCCH, the UE does not generate a Type-1 HARQ-ACK codebook. In this case, the UE generates a Type-2 HARQ-ACK codebook (step 1130).

The HARQ-ACK codebook generation is by concatenating $N_{cells}^{Type2}$ Type-2 HARQ-ACK sub-codebooks for the $N_{cells}^{Type2}$ groups of cells as described in FIG. 10.

When the UE does not receive any PDCCHs or any SPS PDSCHs associated with cells of a group from $N_{cells}^{Type2}$ groups of cells that the UE would report respective HARQ-ACK information in a PUCCH, the UE does not generate a Type-2 HARQ-ACK sub-codebook for the group of cells.

In step 1140, the UE concatenates HARQ-ACK information bits for the Type-1 HARQ-ACK codebook, when any, and for the Type-2 HARQ-ACK codebook, when any, multiplexes the concatenated HARQ-ACK information bits in a PUCCH or PUSCH, and transmits the PUCCH or PUSCH.

In certain embodiments, when a UE (such as the UE 116) is configured to provide $N_{cells}^{Type2}$ Type-2 HARQ-ACK sub-codebooks for respective $N_{cells}^{Type2}$ groups of cells, a DAI field in a DCI format scheduling a PUSCH transmission by the UE includes $N_{cells}^{Type2}$ groups of one bit, or two bits, or four bits having a one-to-one mapping with the $N_{cells}^{Type2}$ Type-2 HARQ-ACK sub-codebooks wherein, the functionality of each group of bits is same as when the UE is configured for CA operation only over the cells in a corresponding group of cells from the $N_{cells}^{Type2}$ groups of cells.

Although FIG. 10 illustrates the method 1000 and the FIG. 11 illustrates the method 1100 various changes may be made to FIGS. 10 and 11. For example, while the method 1000 and the method 1100 are shown as a series of steps, various steps could overlap, occur in parallel, occur in a different order, or occur multiple times. In another example, steps may be omitted or replaced by other steps. For example, steps of the method 1000 and the method 1100 can be executed in a different order.

Embodiments of the present disclosure also describe reducing a Type-1 HARQ-ACK codebook size. The following examples and embodiments, such as those of FIGS. 12 and 13 describe reducing a Type-1 HARQ-ACK codebook size.

Figure 12:
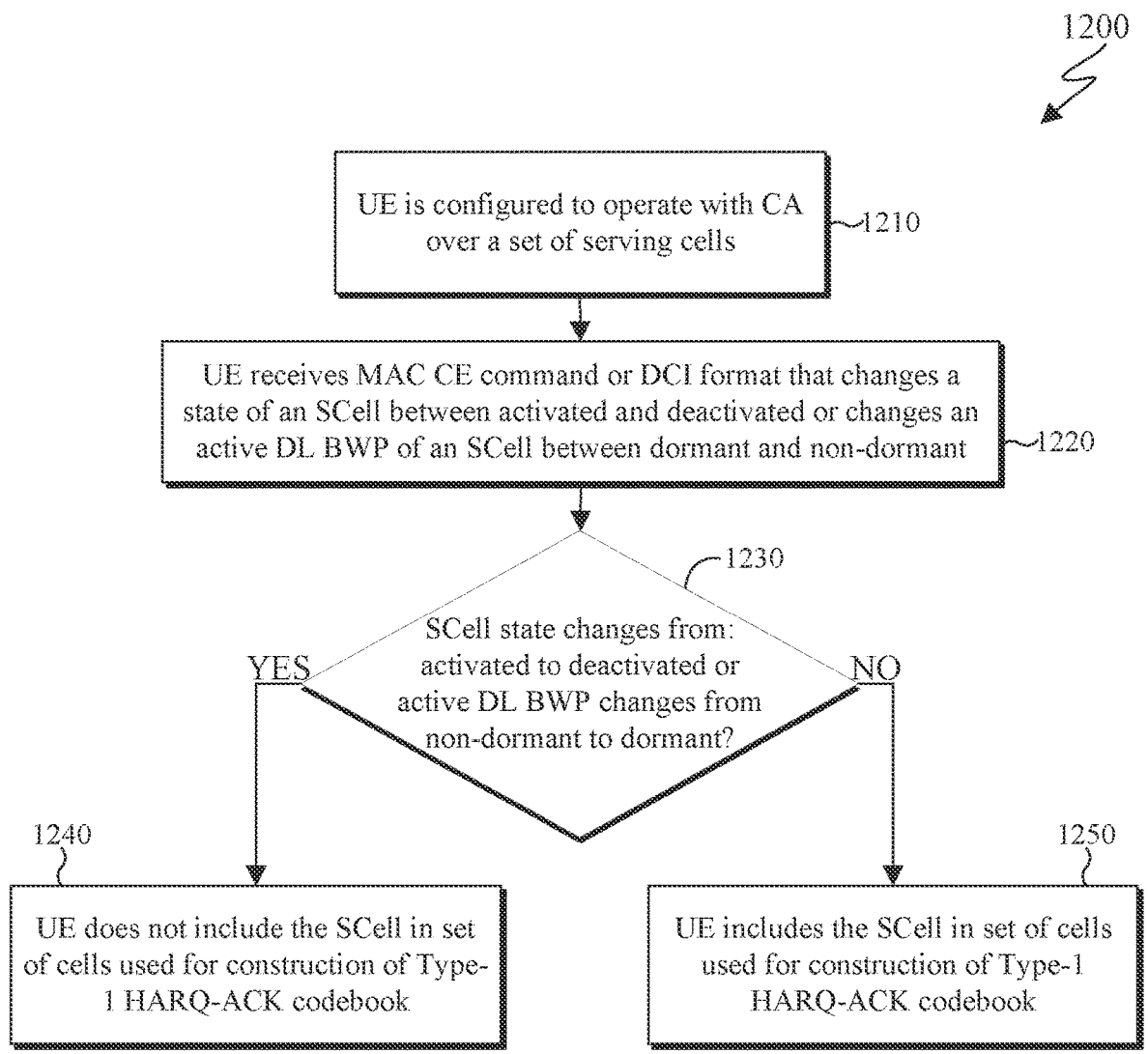
FIG. 12 illustrates an example method for constructing a Type-1 HARQ-ACK codebook based on active secondary cells (SCells) having non-dormant bandwidth parts (BWPs) as respective active downlink (DL) BWPs according to embodiments of the present disclosure.
Figure 13:
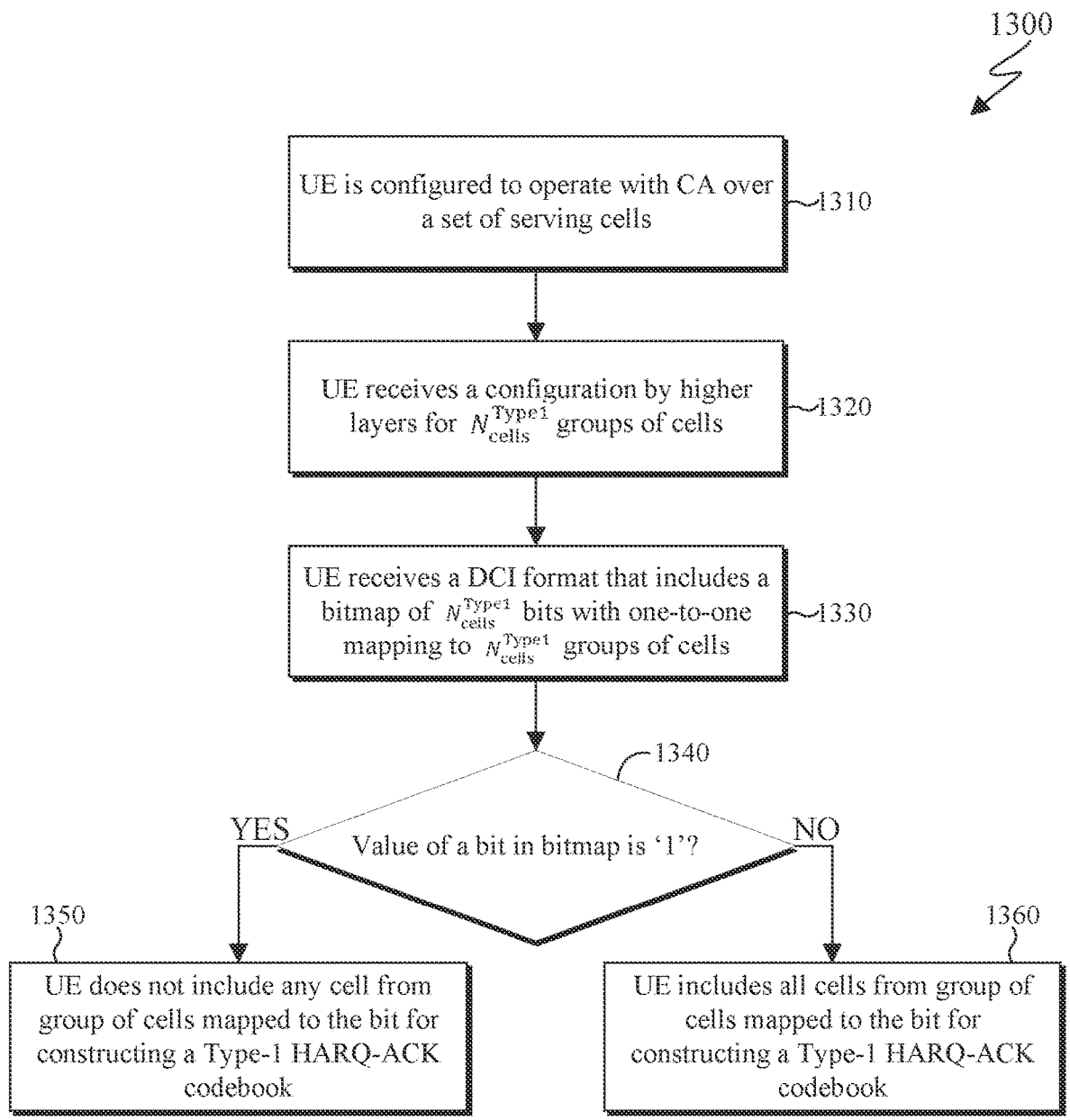
FIG. 13 illustrates an example method for a UE to determine whether to include a group of cells in Type-1 HARQ-ACK codebook construction according to embodiments of the present disclosure.

FIG. 12 illustrates an example method 1200 for constructing a Type-1 HARQ-ACK codebook based on active SCells having non-dormant BWPs as respective active DL BWPs according to embodiments of the present disclosure. FIG. 13 illustrates an example method 1300 for a UE to determine whether to include a group of cells in Type-1 HARQ-ACK codebook construction according to embodiments of the present disclosure. The steps of the method 1200 and the method 1300 can be performed by any of the UEs 111-119 of FIG. 1, such as the UE 116 of FIG. 3. The methods 1200 and 1300 are for illustration only and other embodiments can be used without departing from the scope of the present disclosure.

Embodiments of the present disclosure take into consideration that a disadvantage in using a Type-1 HARQ-ACK codebook is a substantial redundancy in HARQ-ACK information bits (with NACK values) that do not correspond to actual transmissions of PDCCHs with DCI formats having associated HARQ-ACK information or of PDSCHs that provide TBs/CBGs. Further, in order to avoid a dependence on a Type-1 HARQ-ACK format construction on receptions of DCI formats, the Type-1 HARQ-ACK codebook is based on a set of configured DL cells and does not depend on whether a configured DL SCell is deactivated or on whether an active DL BWP of an activated SCell is a dormant DL BWP. However, use of a Type-1 HARQ-ACK codebook is motivated by an inability for correct setting of values of a DAI field in DCI formats associated with HARQ-ACK information and does not relate to excluding deactivated SCells or activated SCells having a dormant BWP as active DL BWP.

In certain embodiments, when a UE (such as the UE 116) receives a DCI format or a MAC control element (CE) switching a state of a cell between activated and deactivated or switching an active DL BWP of an activated SCell between a dormant BWP and a non-dormant BWP, the UE provides corresponding HARQ-ACK information according to predetermined timelines. Moreover, the UE is required to apply a MAC CE command also based on a predetermined timeline. Based on the HARQ-ACK information for the DCI format or the MAC CE command, a serving gNB can be informed whether the UE correctly received the DCI format or the MAC CE command and can know whether the UE applies an activated or deactivated state for an SCell or uses a dormant or a non-dormant BWP as an active DL BWP. The UE can construct a Type-1 HARQ-ACK codebook by considering only activated SCells and, when the UE is configured for operation with dormant/non-dormant BWPs on SCells, only activated SCells where the UE has an active DL BWP that is not a dormant BWP.

The method 1200 of FIG. 12, describes a procedure for constructing a Type-1 HARQ-ACK codebook based on activated SCells having non-dormant BWPs as respective active DL BWPs.

In step 1210, a UE (such as the UE 116) is configured to operate with CA over a set of serving cells. In step 1220, the UE receives a MAC CE command or a DCI format that changes a state of an SCell between activated and deactivated or changes an active DL BWP of an SCell between dormant and non-dormant. For a Type-1 HARQ-ACK codebook that is reported after a predetermined time associated with the application of the MAC CE command, the UE, in step 1230, determines whether the state of the SCell changes from activated to deactivated or changes the active DL BWP of the SCell changes from non-dormant to dormant.

When the state of the SCell changes from activated to deactivated or changes the active DL BWP of the SCell changes from non-dormant to dormant, the UE, in step 1240, does not include the SCell in the set of cells used for construction of the Type-1 HARQ-ACK codebook. Alternatively, when the state does not change from activated to deactivated or does not change from active DL BWP of the SCell to non-dormant to dormant, the UE, in step 1250, includes the SCell in the set of cells used for construction of the Type-1 HARQ-ACK codebook.

In certain embodiments, a size of a Type-1 HARQ-ACK codebook can be reduced by a serving gNB (such as the BS 102) informing to a UE (such as the UE 116) to not include one or more cells that the gNB indicates either by higher layers or by DCI formats that are associated with HARQ-ACK information from the UE. For example, the gNB can determine sparse scheduling to the UE on some cells and may choose to forgo corresponding HARQ-ACK information. For example, based on a buffer status for the UE at the gNB, the gNB can determine that scheduling of the UE on one or more groups of cells would not be necessary for a next reporting of a Type-1 HARQ-ACK codebook from the UE. Therefore, the gNB can inform the UE by higher layer signaling a set of cells with disabled reporting of HARQ-ACK information and the UE does not include the set of cells in the determination of a Type-1 HARQ-ACK codebook.

A set of cells can also be partitioned into groups of cells and DCI formats, such as some of the DCI formats associated with reporting of HARQ-ACK information from the UE, can indicate the groups of cells that the UE should (or should not) include corresponding HARQ-ACK information in a Type-1 HARQ-ACK codebook. Although that approach introduces additional bits in a DCI format, it enables a serving gNB to perform fast adaptation of a Type-1 HARQ-ACK codebook size and reflect changes in the UE buffer status for DL traffic or in a signal-to-noise and interference ratio (SINR) that the UE experiences for a PUCCH transmission with a Type-1 HARQ-ACK codebook. For example, when a buffer size for DL traffic to a UE increases or as DL traffic requiring larger data rates arrives for the UE, a serving gNB can determine that the UE would be subsequently scheduled PDSCH transmissions over a larger number of groups of cells in order to achieve higher data rates. For example, based on a CSI report from the UE, the serving gNB can determine that the UE would be scheduled over a first group of cells and would not be scheduled over a second group of cells.

A serving gNB can adapt a Type-1 HARQ-ACK codebook for a UE according to changes in scheduling PDSCH receptions to the UE in groups of cells by configuring $N_{cells}^{Type1}$ groups of cells to the UE and using a field of $N_{cells}^{Type1}$ bits in some DCI formats, such as in some of the DCI formats scheduling PDSCH receptions to the UE, to indicate groups of cells, from the $N_{cells}^{Type1}$ groups of cells, that the UE should use (or should not use) in constructing a Type-1 HARQ-HARQ-ACK codebook to report in a PUCCH, wherein the $N_{cells}^{Type1}$ bits of the field provide a bitmap with a one-to-one mapping with the $N_{cells}^{Type1}$ groups of cells. Alternatively, a field of $N_{cells}^{Type1}$ bits can indicate one of $2^{N_{cells}^{Type1}}$ combinations/groups of cells that are configured by RRC signaling for the UE to construct a Type-1 HARQ-ACK codebook. It is also possible that the $N_{cells}^{Type1}$ groups of cells do not include all cells from the set of cells the UE is configured for CA operation and then the UE always provides HARQ-ACK information for cells that are not included in any of the $N_{cells}^{Type1}$ cells groups of cells. For each group of cells, the UE generates a Type-1 HARQ-ACK sub-codebook in a same manner as when the UE is configured only the cells in the group of cells for CA operation. The Type-1 HARQ-ACK codebook is then formed by concatenating Type-1 HARQ-ACK sub-codebooks in an ascending order of a group index.

The method 1300 of FIG. 13, describes a procedure for a UE to determine whether or not to include a group of cells in a Type-1 HARQ-ACK codebook construction.

In step 1310, a UE (such as the UE 116) is configured to operate with CA over a set of serving cells. In step 1320, the UE receives a configuration by higher layers for $N_{cells}^{Type1}$ groups of cells from the set of serving cells (including the serving cells in each group from the $N_{cells}^{Type1}$ groups of cells). In step 1330, the UE correctly receives a DCI format that includes a field providing a bitmap of $N_{cells}^{Type1}$ bits wherein the bits of the bitmap have a one-to-one mapping with $N_{cells}^{Type1}$ groups of cells.

In step 1340, the UE determines whether a value of a bit in the bitmap is a binary '1.' When the value of the bit in the bitmap is a binary '1', the UE, in step 1350, does not include any cell from a group of cells corresponding to the bit for constructing a Type-1 HARQ-ACK codebook. Alternatively, when the value of the bit in the bitmap is not binary '1', the UE, in step 1360, includes all cells from the group of cells corresponding to the bit for constructing a Type-1 HARQ-ACK codebook. It is also possible that instead of providing a bitmap, the field of of $N_{cells}^{Type1}$ bits indicates a combination of cells, from $2 N_{cells}^{Type1}$ combinations of cells that were configured by RRC signaling, for the UE to generate a Type-1 HARQ-ACK codebook.

In certain embodiments, when a UE (such as the UE 116) is configured to provide $N_{cells}^{Type1}$ Type-1 HARQ-ACK sub-codebooks for respective $N_{cells}^{Type1}$ groups of cells, a DAI field in a DCI format scheduling a PUSCH transmission by the UE includes $N_{cells}^{Type1}$ bits having a one-to-one mapping with the $N_{cells}^{Type1}$ Type-1 HARQ-ACK sub-codebooks. For example, a value of '1' indicates to the UE to provide a corresponding Type-1 HARQ-ACK sub-codebook and a value of '0' indicates to the UE to not provide a corresponding Type-1 HARQ-ACK sub-codebook (the UE always provides HARQ-ACK information for a SPS PDSCH release or for SPS PDSCH receptions when a corresponding cell is in the group of cells for the Type-1 HARQ-ACK sub-codebook).

In the above descriptions, the UE does not generate a Type-1 HARQ-ACK sub-codebook for a group of cells to multiplex in a PUCCH when for the group of cells the UE receives only a SPS PDSCH release, or SPS PDSCHs, or a PDSCH that is scheduled by DCI format 1_0 with a counter DAI field value of 1 on the primary cell (in case the primary cell is in the group of cells), but for the Type-1 HARQ-ACK codebook construction from the concatenation of Type-1 HARQ-ACK sub-codebooks, HARQ-ACK information corresponding to the above receptions can be viewed as a Type-1 HARQ-ACK sub-codebook and is concatenated according to an index of a corresponding cell group.

Although FIG. 12 illustrates the method 1200 and the FIG. 13 illustrates the method 1300 various changes may be made to FIGS. 12 and 13. For example, while the method 1200 and the method 1300 are shown as a series of steps, various steps could overlap, occur in parallel, occur in a different order, or occur multiple times. In another example, steps may be omitted or replaced by other steps. For example, steps of the method 1200 and the method 1300 can be executed in a different order.

Embodiments of the present disclosure also describe increasing indication granularity for a Type-3 HARQ-ACK codebook construction. The following examples and embodiments, such as those of FIG. 14 describe increasing indication granularity for a Type-3 HARQ-ACK codebook construction. For example, embodiments of this disclosure describe a procedure to provide increased indication granularity for serving cells and HARQ processes with corresponding HARQ-ACK information in a Type-3 HARQ-ACK codebook.

Figure 14:
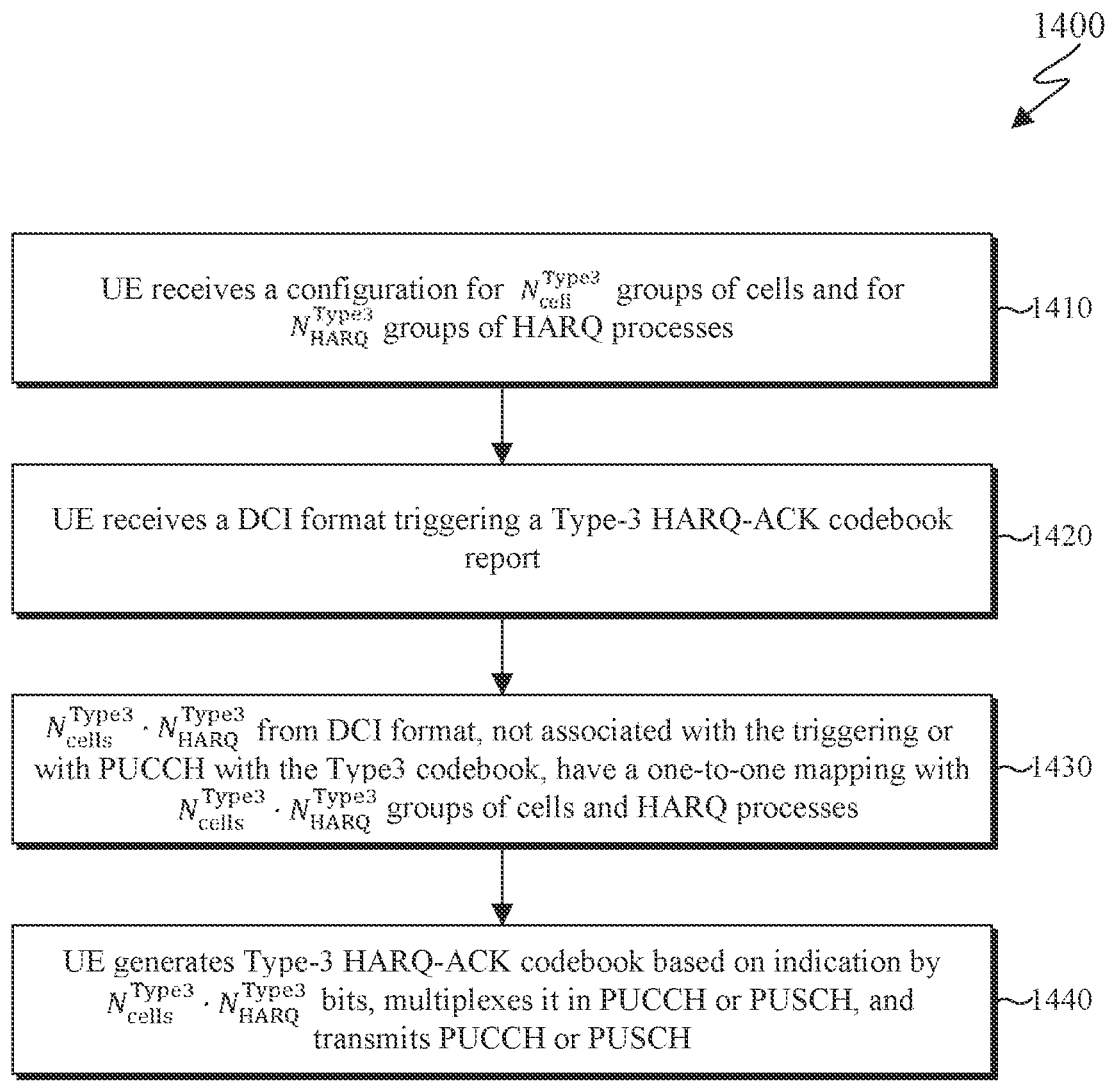
FIG. 14 illustrates an example method for triggering Type-3 HARQ-ACK codebook according to embodiments of the present disclosure.

FIG. 14 illustrates an example method 1400 for triggering Type-3 HARQ-ACK codebook according to embodiments of the present disclosure. The steps of the method 1400 can be performed by any of the UEs 111-119 of FIG. 1, such as the UE 116 of FIG. 3. The method 1400 is for illustration only and other embodiments can be used without departing from the scope of the present disclosure.

In certain embodiments, a Type-3 HARQ-ACK codebook size can be reduced by using bits from unused fields in a DCI format triggering the Type-3 HARQ-ACK codebook multiplexing in a PUCCH to indicate cell groups and/or groups of HARQ processes per cell group. A UE (such as the UE 113) can be configured by higher layers with $N_{cells}^{Type3}$ groups of cells and $N_{cells}^{Type3}$ bits in the DCI format triggering a Type-3 HARQ-ACK codebook can indicate groups of cells, from the $N_{cells}^{Type3}$ groups of cells, that the UE should provide (or should not provide) HARQ-ACK information in the Type-3 HARQ-ACK codebook. The $N_{cells}^{Type3}$ bits provide a bitmap having a one-to-one mapping with the $N_{cells}^{Type3}$ groups of cells.

Also, the HARQ processes can be configured to be over $N_{cells}^{Type3}$ groups of HARQ processes and $N_{cells}^{Type3} \cdot N_{HARQ}^{Type3}$ bits in the DCI format can provide a two-dimensional one-to-one mapping to groups of cells and groups of HARQ processes per group of cells for the UE to provide HARQ-ACK feedback in a Type-3 HARQ-ACK codebook. Additionally, if for $N_{cell,2}^{Type3} \le N_{cell,2}^{Type3}$ cell groups a maximum number of TBs in a PDSCH reception for at least one cell is 2 (and is one in $N_{cells,1}^{Type3} = N_{cells}^{Type3} - N_{cells,2}^{Type3}$ cell groups), the bitmap in the DCI format can include $2 \cdot N_{cells,2}^{Type3} \cdot N_{cells}^{Type3} - N_{cells,2}^{Type3} N_{HARQ}^{Type3} + N_{cells,1}^{Type3} \cdot N_{HARQ}^{Type3}$ bits; otherwise, for $N_{cells}^{Type3} \cdot N_{HARQ}^{Type3}$ an to the UE whether or not to provide HARQ-ACK information for a HARQ process on a cell is applicable to all TBs associated with the HARQ process on the cell. Further, independently of the indication by the DCI format based on the $N_{cells}^{Type3} \cdot N_{HARQ}^{Type3}$ bits, the UE can exclude from the Type-3 HARQ-ACK codebook HARQ-ACK information bits for a deactivated SCell or for an activated SCell with a dormant BWP as the active DL BWP.

The $N_{cells}^{Type3} \cdot N_{HARQ}^{Type3}$ bits can be from any one or more fields of the DCI format that can be predefined in a use order depending on the total number of $N_{cells}^{Type3 \cdot N}_{HARQ}$ bits. In addition to fields of a DCI format that are used for determining that the DCI format triggers a Type-3 HARQ-ACK codebook fields associated with a PUCCH transmission that provides the Type-3 HARQ-ACK codebook, such as a PUCCH resource indicator field, a PDSCH-to-HARQ_feedback timing indicator field, a TPC command field for determining a PUCCH transmission power, and a priority indicator field for the PUCCH transmission are also excluded from fields that can be used to provide the $N_{cells}^{Type3} \cdot N_{HARQ}^{Type3}$.

For example, for eight configured cells and eight HARQ processes per cell, the UE can be provided a configuration for $N_{cells}^{Type3}=4$ cell groups comprising of cells {cell#0, cell#1}, {cell#2, cell#3}, {cell#4, cell#5}, and {cell#6, cell#7}, and for $N_{HARQ}^{Type3}=8$ groups of HARQ processes corresponding to a single HARQ process per group of HARQ processes. Then, a bitmap of 32 bits can indicate whether or not the UE should provide HARQ-ACK information for each HARQ process for the pairs of cells {cell#0, cell#1}, {cell#2, cell#3}, {cell#4, cell#5}, and {cell#6, cell#7}.

For another example, for 16 configured cells and 16 HARQ processes per cell, the UE can be provided a configuration for $N_{cells}^{Type3}=8$ cell groups comprising of cells {cell#0, cell#1}, {cell#2, cell#3}, {cell#4, cell#5}, {cell#6, cell#7}, {cell#8, cell#9}, {cell#10, cell#11}, {cell#12, cell#13}, and {cell#14, cell#15}, and for $N_{HARQ}^{Type}=8$ groups of HARQ processes comprising of HARQ processes {HPN#0, HPN#1}, {HPN#2, HPN#3}, {HPN#4, HPN#5}, {HPN#6, HPN#7}, {HPN#8, HPN#9}, {HPN#10, HPN#11}, {HPN#12, HPN#13}, and {HPN#14, HPN#15}. Then, a bitmap of 64 bits can indicate whether or not the UE should provide HARQ-ACK information per group/pair of HARQ processes and per group/pair of cells.

The method 1400 of FIG. 14, describes a procedure for triggering a Type-3 HARQ-ACK codebook.

In step 1410, a UE (such as the UE 116) receives a configuration by higher layers for $N_{cells}^{Type3}$ groups of cells and for $N_{HARQ}^{Type3}$ groups of HARQ processes. In step 1420, the UE receives a DCI format triggering a Type-3 HARQ-ACK codebook report.

In step 1430, a number of $N_{cells}^{Type3} \cdot N_{HARQ}^{Type3}$ bits from fields of the DCI format that are not associated with an indication for the Type-3 HARQ-ACK codebook report triggering or with parameters, such as resource, a slot timing, or a power adjustment, of a PUCCH transmission providing the Type-3 HARQ-ACK codebook report have a one-to-one mapping with the $N_{cells}^{Type3} \cdot N_{HARQ}^{Type3}$ groups of cells and HARQ processes and indicate whether or not the UE should provide HARQ-ACK information for each group of cells and each group of HARQ processes. For example, a binary value of '0' indicates that HARQ-ACK information is not provided and a value of '1' indicates that HARQ-ACK information is provided.

In step 1440, the UE generates a Type-3 HARQ-ACK codebook according to the indication by the $N_{cells}^{Type3} \cdot N_{HARQ}^{Type3}$ bits, multiplexes the Type-3 HARQ-ACK codebook in a PUCCH or PUSCH, and transmits the PUCCH or PUSCH.

In certain embodiments, in order to avoid a gNB (such as the BS 102) having to transmit a PDCCH in order to trigger a Type-3 HARQ-ACK codebook and, due to a limited number of available bits in a DCI format triggering the Type-3 HARQ-ACK codebook for indicating groups of cells and groups of HARQ processes, avoid a group of cells to comprise of multiple cells or a group of HARQ processes to comprise of multiple HARQ processes, triggering of a Type-3 HARQ-ACK codebook can be by a MAC CE. The MAC CE can include a bitmap with a one-to-one mapping to each configured cell and each HARQ process per configured cell, or to a group of configured cells and a group of HARQ processes as previously described, wherein a bit of the bitmap indicates whether or not the UE should provide HARQ-ACK information for a corresponding cell (or group of cells) and HARQ process (or group of HARQ processes).

In certain embodiments, when a MAC CE in a PDSCH reception triggers a Type-3 HARQ-ACK codebook, the UE provides the Type-3 HARQ-ACK codebook in a PUCCH transmission that is indicated by a DCI format scheduling the PDSCH reception instead of a Type-1 HARQ-ACK codebook or a Type-2 HARQ-ACK codebook that the UE could be configured to provide otherwise. When the PUCCH transmission overlaps in time with a PUSCH transmission, the UE may multiplex the Type-3 HARQ-ACK codebook in the PUSCH.

In addition to the triggering of a Type-3 HARQ-ACK information report, a MAC CE can also include values for a PUCCH resource indicator field, a PDSCH-to-HARQ_feedback timing indicator field, or a TPC command field.

Although FIG. 14 illustrates the method 1400 various changes may be made to FIG. 14. For example, while the method 1400 is shown as a series of steps, various steps could overlap, occur in parallel, occur in a different order, or occur multiple times. In another example, steps may be omitted or replaced by other steps. For example, steps of the method 1400 can be executed in a different order.

In the following (such as in the descriptions of FIGS. 15-21), when not explicitly mentioned, the term "first DCI format" is used to refer to a DCI format scheduling only a single PDSCH reception and the term "second DCI format" is used to refer to a DCI format scheduling more than one PDSCH reception. Further, for the purposes of generating HARQ-ACK information, instead of scheduling a PDSCH reception, a DCI format can indicate a SPS PDSCH release or SCell dormancy without scheduling a PDSCH reception, and so on but, for brevity, explicit reference will be limited to scheduling of PDSCH receptions.

Embodiments of the present disclosure also describe a determination of a HARQ-ACK codebook that includes HARQ-ACK information in response to TBs in multiple PDSCH receptions scheduled by a single DCI format. The following examples and embodiments, such as those of FIGS. 15-19 describe determining a HARQ-ACK codebook.

Figure 15:
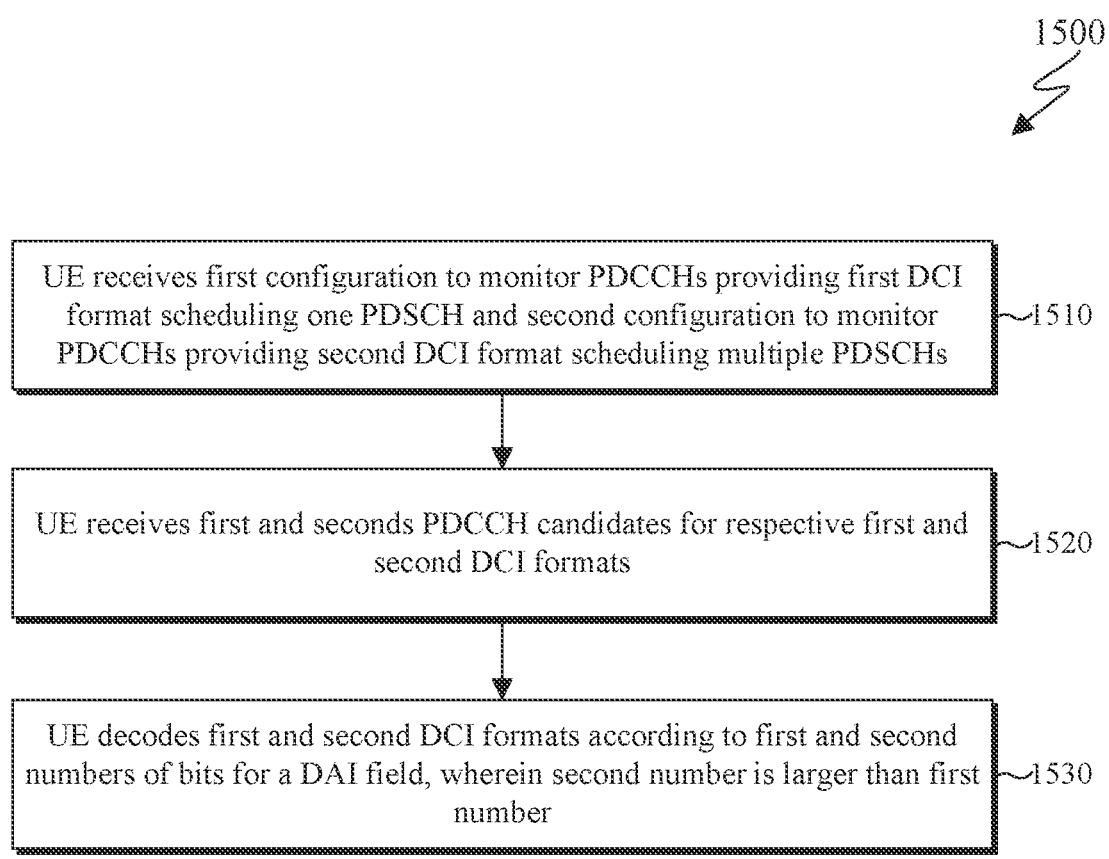
FIG. 15 illustrates an example method for determining a number of bits for a counter downlink assignment index (DAI) depending on a DCI format that provides the counter DAI according to embodiments of the present disclosure.
Figure 16:
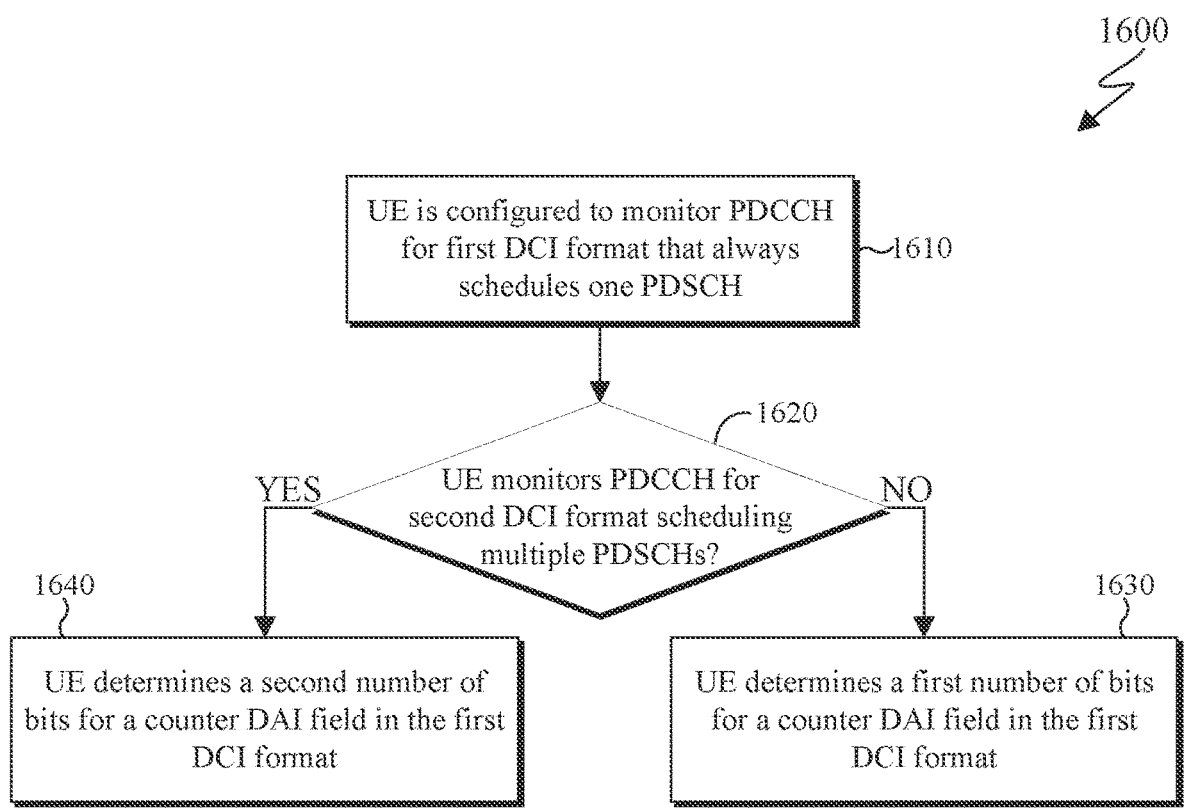
FIG. 16 illustrates an example method for a UE to determine a number of bits for a counter DAI in a first DCI format used for scheduling only one physical downlink shared channel (PDSCH) reception according to embodiments of the present disclosure.
Figure 17:
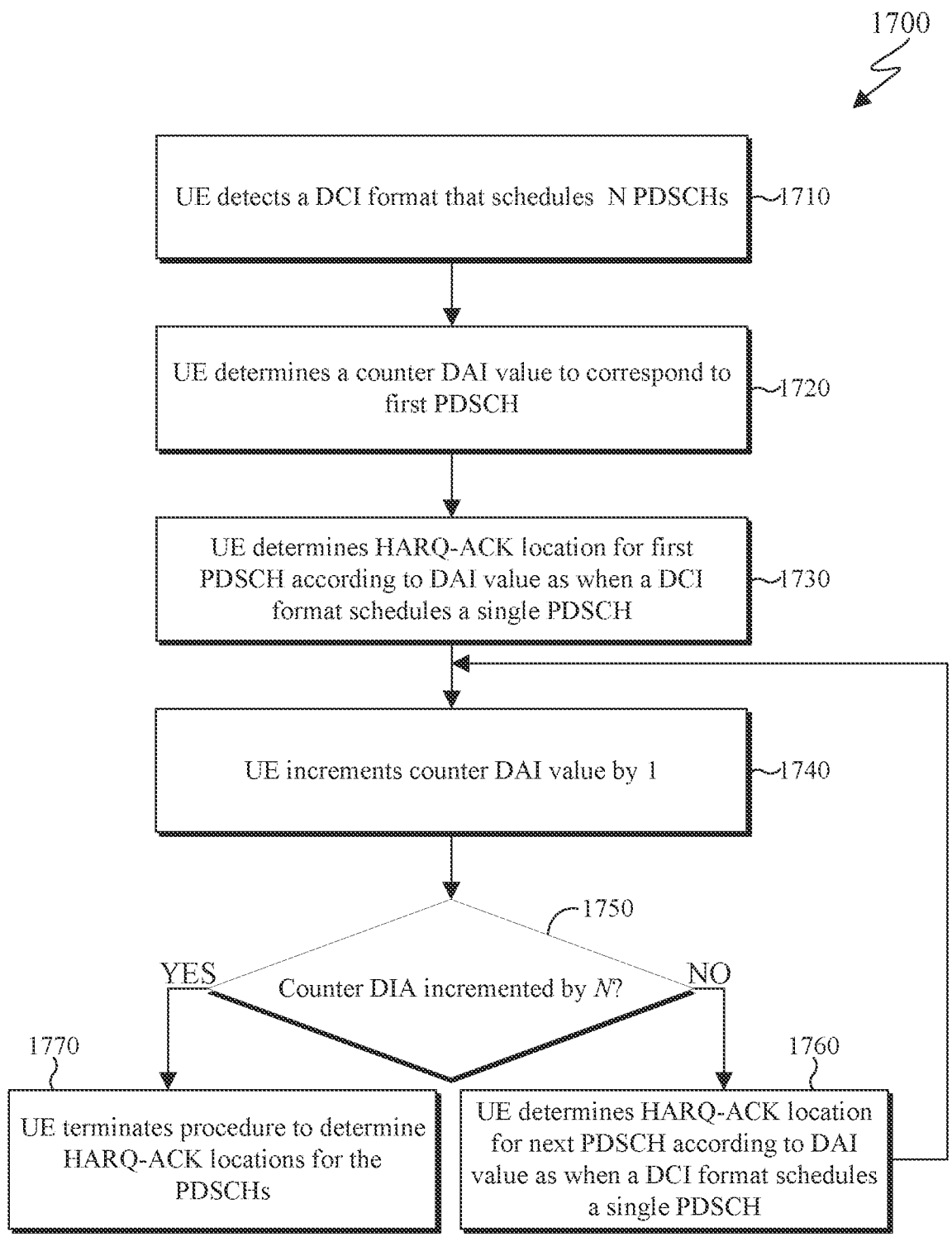
FIG. 17 illustrates an example method for a UE to determine a location in a HARQ-ACK codebook for HARQ-ACK information bits according to embodiments of the present disclosure.
Figure 18:
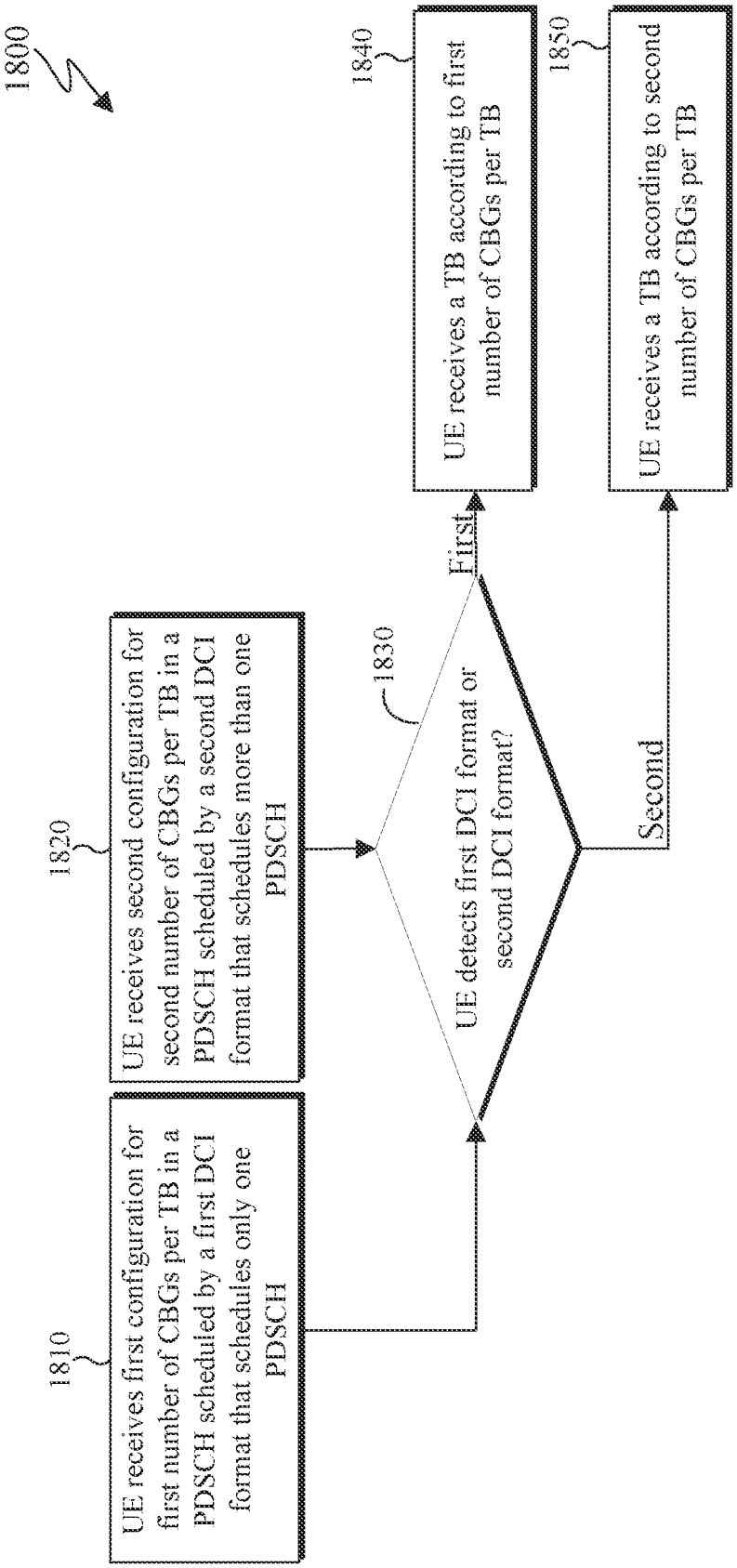
FIGS. 18 and 19 illustrate example methods for a UE to determine a number of codebook blocks (CBGs) per transport block (TB) depending on a DCI format that schedules a PDSCH reception according to embodiments of the present disclosure.
Figure 19:
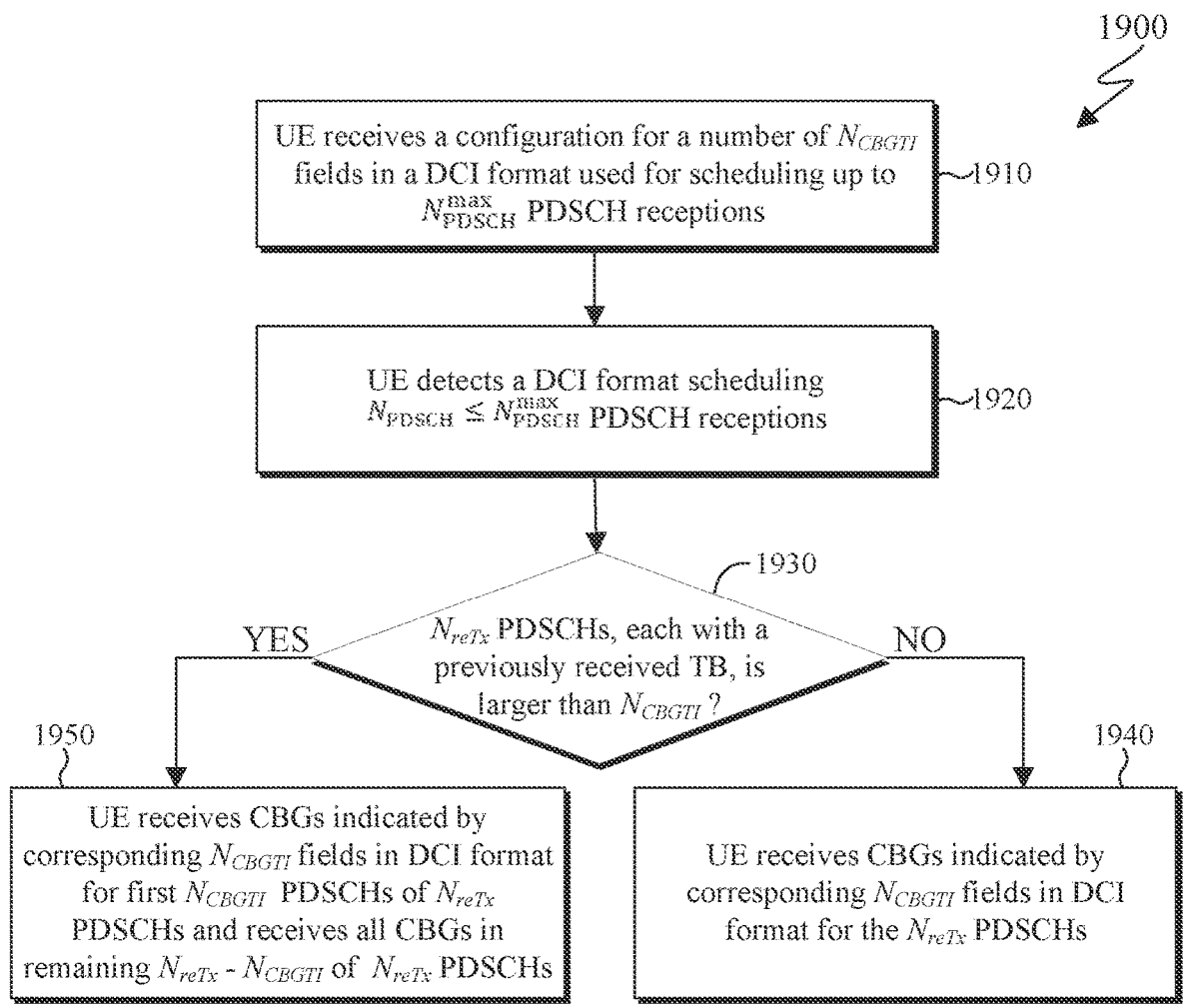

FIG. 15 illustrates an example method 1500 for determining a number of bits for a counter downlink assignment index (DAI) depending on a DCI format that provides the counter DAI according to embodiments of the present disclosure. FIG. 16 illustrates an example method 1600 for a UE to determine a number of bits for a counter DAI in a first DCI format used for scheduling only one PDSCH reception according to embodiments of the present disclosure. FIG. 17 illustrates an example method 1700 for a UE to determine a location in a HARQ-ACK codebook for HARQ-ACK information bits according to embodiments of the present disclosure. FIGS. 18 and 19 illustrate example methods 1800 and 1900, respectively, for a UE to determine a number of CBGs per TB depending on a DCI format that schedules a PDSCH reception according to embodiments of the present disclosure. The steps of the methods 1500-1900 can be performed by any of the UEs 111-119 of FIG. 1, such as the UE 116 of FIG. 3. The methods 1500-1900 are for illustration only and other embodiments can be used without departing from the scope of the present disclosure.

In certain embodiments, a DCI format scheduling the multiple PDSCH receptions includes a PDSCH-to-HARQ_feedback timing indicator field with a value indicating a slot for a PUCCH transmission with HARQ-ACK information associated with the multiple PDSCH receptions. The indication is interpreted with respect to slots of PUCCH transmission, instead of slots of PDSCH reception, and is relative to a slot of PUCCH transmission that overlap with a slot of a last PDSCH reception from the multiple PDSCH receptions.

For a Type-1 HARQ-ACK codebook, a determination remains the same (or similar) as for the case a DCI format schedules a single PDSCH reception. This is because the Type-1 HARQ-ACK codebook depends only on valid entries of a TDRA table per slot does not depend on a DCI format scheduling a potential PDSCH reception according to a valid entry.

For a Type-2 HARQ-ACK codebook, a determination should be modified for the case of a DCI format scheduling more than one PDSCH receptions and values of corresponding DAI fields need to index all of the more than one PDSCH receptions. A number of bits representing a counter DAI value and a number of bits representing a total DAI value need to be adjusted according to the maximum number of PDSCH receptions that are scheduled by the DCI format. For example, when a counter DAI field is represented by two bits, it is not possible for the DCI format to schedule four or more PDSCH receptions as, in such case, a UE cannot determine whether or not the UE failed to detect a DCI format and the functionality of the DAI field is lost. Therefore, a size of the DAI field can be different in a DCI format used for scheduling only one PDSCH reception than in a DCI format used for scheduling more than one PUSCH receptions.

For example, for a first DCI format used for scheduling only one PDSCH reception, a counter DAI can be represented by 2 bits while for a second DCI format used for scheduling a maximum of four PDSCH receptions, a counter DAI can be represented by three bits or four bits. A same design can apply for a total DAI. In general, when the second DCI format schedules $N_{PDSCH}^{max}$ PDSCH receptions, a counter DAI or a total DAI is represented in Equation (1), below.

$$\lfloor \log_2(N_{PDSCH}^{max}) \rfloor + \text{bits} \tag{1}$$

Here, in Equation (1), $\lfloor \ \rfloor$ is the floor function that rounds a number to its next smaller integer. In order to provide protection to missed detections of M DCI formats, assuming values of M and $N_{PDSCH}^{max}$ that are powers of 2, a counter DAI needs to be represented in Equation (2), below.

$$\log_2(N_{PDSCH}^{max}) + \log_2(M) \text{ bits} \tag{2}$$

For the first DCI format and for a first alternative, a counter DAI can be represented by $\log_2$ (M) bits. Similar considerations for a number of bits can also apply for a total DAI. A tradeoff of the first alternative is that a number of bits for a DAI field in the first DCI format does not increase depending on whether or not the UE is also configured to monitor PDCCH for the second DCI format but, as is subsequently discussed for the second alternative, a functionality that the DAI field provides to the UE for identifying missed detection of DCI format is generally reduced.

In certain embodiments, separate configurations can be provided to a UE (such as the UE 116) for a first number of bits of a DAI field in the first DCI format, such as a DCI format 1_2, and for a second number of bits of a DAI field in the second DCI format. It is also possible for a number of bits for a DAI field to be predetermined in the system specifications, such as for example to be 2 bits for the counter DAI for the first DCI format, as for DCI format 1_0 or DCI format 1_1 or as expressed in Equation (3) bits for the counter DAI for the DCI format used for scheduling a maximum of $N_{PDSCH}^{max}$ PDSCH receptions. Similar considerations apply for the total DAI, when a DCI format includes a total DAI.

$$\log_2(N_{PDSCH}^{max}) + 2 \text{ bits} \tag{3}$$

The method 1500 of FIG. 15, describes an example procedure to determine a number of bits for a counter DAI depending on a DCI format that provides the counter DAI.

In step 1510, a UE (such as the UE 116) receives a first configuration for monitoring PDCCH providing a first DCI format used for scheduling one PDSCH reception and a second configuration for monitoring PDCCH providing a second DCI format used for scheduling multiple PDSCH receptions. As the second DCI format can have a substantially larger size than the first DCI format, separate configurations for respective PDCCH monitoring are beneficial at least for providing a different number of PDCCH candidates per CCE aggregation level (other parameters, such as a monitoring periodicity can also be different). In step 1520, the UE receives a first PDCCH candidate for the first DCI format and a second PDCCH candidate for the second DCI format. In step 1530, the UE decodes the first DCI format according to a first number of bits for a DAI field and decodes the second DCI format according to a second number of bits for the DAI field, wherein the second number of bits is larger than the first number of bits.

In a second alternative, when a UE (such as the UE 116) is scheduled PDSCH receptions by a first DCI format (used for scheduling one PDSCH reception) or by a second DCI format (used scheduling multiple PDSCH receptions) in any possible order, a size of the DAI field can also increase for the first DCI format in order to maintain a same UE capability for identifying missed detections of DCI formats as for the case that the UE is not configured to monitor PDCCH for detection of the second DCI format. For example, when the first DCI format provides a counter DAI value represented by 2 bits then, when the UE fails to detect two DCI formats scheduling a total of $N_{PDSCH}^{tot} > 4$ PDSCH receptions, the UE cannot determine, based on the value of the counter DAI field in a subsequent DCI format that the UE detects, whether the number of PDSCHs that the UE did not receive is $N_{PDSCH}^{tot}$ or $N_{PDSCH}^{tot}$ mod 4. Therefore, when a UE is configured to monitor PDCCH for detection of the second DCI format scheduling up to $N_{PDSCH}^{max} > 1$ PDSCH receptions, a number of bits used for a counter DAI, or for a total DAI, in the first DCI format used for scheduling only one PDSCH reception can be larger than a corresponding number of bits in the first DCI format when the UE is not configured to monitor PDCCH for detection of the second DCI format. For example, in the former case, a number of bits for a counter DAI (or for a total DAI) can be described in Equation (3), above, and in the latter case a number of bits for a counter DAI (or for a total DAI) can be two.

The method 1600 of FIG. 16, describes an example procedure for a UE to determine a number of bits for a counter DAI in a first DCI format used for scheduling only one PDSCH reception depending on whether or not the UE is configured to monitor PDCCH for a detection of a second DCI format used for scheduling more than one PDSCH receptions.

In step 1610, a UE (such as the UE 116) receives a configuration to monitor PDCCH for detection of a first DCI format used for scheduling only one PDSCH reception. In step 1620, the UE determines whether the UE is also configured to monitor PDCCH for detection of a second DCI format used for scheduling a maximum of $N_{PDSCH}^{max} > 1$ PDSCH receptions.

When the UE is not configured to monitor PDCCH for detection of the second DCI format, the UE, in step 1630, determines a first number of bits for a counter DAI field in the first DCI format. For example, the first number of bits for a counter DAI field in the first DCI format can be two bits. The determination can be based on the specifications of the system operation or on a configuration provided by higher layers from a serving gNB.

When the UE is configured to monitor PDCCH for detection of the second DCI format, the UE, in step 1640, determines a second number of bits for the counter DAI field in the first DCI format. For example, the second number of bits for the counter DAI field in the first DCI format based on Equation (3), described above. The determination can be based on the determination of the first number of bits and the addition of $\log_2(N_{PDSCH}^{max})$ bits or can be provided by a separate configuration by higher layers.

In certain embodiments, for determining a Type-2 HARQ-ACK codebook in response to a detection of a second DCI format used for scheduling multiple PDSCH receptions, two options can be considered for a value of a counter DAI in the second DCI format. In a first option, the counter DAI value corresponds to all of the multiple PDSCH receptions. In a second option, the counter DAI value corresponds only to the first of the multiple PDSCH receptions.

In certain embodiments, if the value of the counter DAI indicates all N PDSCH receptions that are scheduled by the second DCI format (first option), then for the placement of corresponding HARQ-ACK information bits in a HARQ-ACK codebook, the value of the DAI needs to be decremented by N−1 to correspond to the first PDSCH reception from the N PDSCH receptions, and then incremented by 1 for each subsequent PDSCH reception from the N PDSCH receptions. For a counter DAI represented by $N_{C-DAI}^{DL}$ bits, the counter DAI value is determined modulo $T_D = 2^{N_{C-DAI}^{DL}}$ and ranges from 0 to $T_D - 1$. Then, a location of HARQ-ACK information bits in a Type-2 HARQ-ACK codebook in response to decoding outcomes for TBs provided by multiple PDSCH receptions that are scheduled by the second DCI format can be determined based on Syntax (1), below, wherein $V_{C-DAI,c,m}^{DL}$ is the value of the counter DAI for PDSCH receptions on cell m scheduled by the second DCI format that is received in a PDCCH at monitoring occasion m.

```
Syntax (1)
set n = 1
while n ≤ N
    if V_{C-DAI,c,m}^{DL} - N + n < 0
        V_{C-DAI,c,m}^{DL} = T_D - N + n
    else
        V_{C-DAI,c,m}^{DL} = V_{C-DAI,c,m}^{DL} - N + n
    end if
    ### Code for placing HARQ-ACK information for PDSCH receptions on cell c that
    are scheduled by a DCI format that the UE detects in PDCCH monitoring occasion m
    ###
    n = n + 1;
end while
```

For completeness, the resulting pseudo-code, denoted as Syntax (2), below, (initialization of parameters are omitted for brevity) includes additional pseudo-code for the second DCI format scheduling multiple PDSCH receptions, which is bolded.

```
Syntax (2)
while m < M
    Set c = 0 - serving cell index: lower indexes correspond to lower RRC indexes of
    corresponding cell
    while c < N_{cells}^{DL}
        if PDCCH monitoring occasion m is before an active DL BWP change on serving
        cell c or an active UL BWP change on the PCell and an active DL BWP change is
        not triggered in PDCCH monitoring occasion m
            c = c + 1;
        else
            if there is a PDSCH on serving cell c associated with PDCCH in PDCCH
            monitoring occasion m, or there is a PDCCH indicating SPS PDSCH release
``` on serving cell c, or there is a PDCCH indicating SCell dormancy without
scheduling PDSCH
    set n = 1
    while n ≤ N
        if $V_{C-DAI,c,m}^{DL} - N + n < 0$
            $V_{C-DAI,c,m}^{DL} = T_D - N + n$
        else
            $V_{C-DAI,c,m}^{DL} = V_{C-DAI,c,m}^{DL} - N + n$
        end if
        if $V_{C-DAI,c,m}^{DL} \le V_{temp}$
            j = j + 1
        end if
        $V_{temp} = V_{C-DAI,c,m}^{DL}$;
        if $V_{T-DAI,m}^{DL} = 0$
            $V_{temp,2} = V_{C-DAI,c,m}^{DL}$
        else
            $V_{temp} = V_{T-DAI,m}^{DL}$
        end if
        if harq-ACK-SpatialBundlingPUCCH is not provided and the UE is
        configured by maxNrofCodeWordsScheduledByDCI with reception of
        two transport blocks for at least one configured DL BWP of at least
        one serving cell,
            $\tilde{o}_{2 \cdot T_D j + 2(V_{C-DAI,c,m}^{DL} - 1)}^{ACK}$ = HARQ-ACK information bit
            corresponding to the first transport block of this cell
            $\tilde{o}_{2 \cdot T_D j + 2(V_{C-DAI,c,m}^{DL} - 1) + 1}^{ACK}$ = HARQ-ACK information bit
            corresponding to the second transport block of this cell
                $V_S = V_S \cup \{2 \cdot T_D \cdot j + 2(V_{C-DAI,c,m}^{DL} - 1), 2 \cdot T_D \cdot j$
                $+ 2(V_{C-DAI,c,m}^{DL} - 1) + 1\}$
        elseif harq-ACK-SpatialBundlingPUCCH is provided to the UE and m
        is a monitoring occasion for PDCCH with a DCI format that supports
        PDSCH reception with two transport blocks and the UE is configured
        by maxNrofCodeWordsScheduledByDCI with reception of two
        transport blocks in at least one configured DL BWP of a serving cell,
            $\tilde{o}_{T_D j + V_{C-DAI,c,m}^{DL} - 1}^{ACK}$ = binary AND operation of the HARQ-ACK
            information bits corresponding to the first and second transport
            blocks of this cell
                $V_S = V_S \cup \{T_D \cdot j + V_{C-DAI,c,m}^{DL} - 1\}$
        else
            $\tilde{o}_{T_D j + V_{C-DAI,c,m}^{DL} - 1}^{ACK}$ = HARQ-ACK information bit of this cell
            $V_S = V_S \cup \{T_D \cdot j + V_{C-DAI,c,m}^{DL} - 1\}$
        end if
        n = n + 1;
    end while
    end if
    c = c + 1;
    end if
end while
m = m + 1;
end while
if $V_{temp2} < V_{temp}$
    j = j + 1;
end if In certain embodiments, if the value of the counter DAI indicates the first of the N PDSCH receptions that are scheduled by the second DCI format (the counter DAI counts DCI formats instead of PDSCH receptions—second option), then for the placement of corresponding HARQ-ACK information bits in a HARQ-ACK codebook, the value of the DAI needs to be incremented by 1 for each PDSCH reception after the first PDSCH reception from the N PDSCH receptions. For a counter DAI represented by $N_{C-DAI}^{DL}$ bits, the counter DAI value is modulo $T_D = 2^{N_{C-DAI}^{DL}}$ and ranges from 0 to $T_D - 1$. Then, a UE (such as the UE 116) can determine a location for HARQ-ACK information bits in a Type-2 HARQ-ACK codebook in response to decoding outcomes for TBs provided by the N PDSCH receptions as described in Syntax (3), below. Here, $V_{C-DAI,c,m}^{DL}$ is the value of the counter DAI for PDSCH receptions on cell m scheduled by the second DCI format that is received in a PDCCH at monitoring occasion m. For the total DAI, either the same procedure as for the counter DAI can apply or the total DAI value indicated in the second DCI format can be applicable for all, not the first, PDSCH receptions.

Syntax (3)
set n = 0
while n < N
    $V_{C-DAI,c,m}^{DL} = V_{C-DAI,c,m}^{DL} + n$;
    ### Code for placing HARQ-ACK information for PDSCH receptions on cell c that are
    scheduled by a DCI format that the UE detects in PDCCH monitoring occasion m ###
    n = n + 1;
end while The method 1700 of FIG. 17, describes an example procedure for a UE, (such as the UE 116) to determine a location in a HARQ-ACK codebook for HARQ-ACK information bits in response to decoding outcomes of TBs provided by multiple PDSCH receptions scheduled by a DCI format.

In step 1710, a UE (such as the UE 116) detects a DCI format in a PDCCH monitoring occasion that schedules N PDSCH receptions on a serving cell. In step 1720, the UE determines a counter DAI value provided by the DCI format to correspond to the first PDSCH reception on the serving cell. In step 1730, the UE determines a location in a HARQ-ACK codebook for HARQ-ACK information bits associated with the PDCCH monitoring occasion and the first PDSCH reception on the serving cell according to the DAI value in a same manner as when the UE detects a DCI format scheduling a single PDSCH reception. In step 1740, the UE increments the counter DAI value.

In step 1750, the UE determines whether the DAI value is incremented N. When the DAI value is not incremented N, the UE, in step 1760 repeats the procedure to determine a location in the HARQ-ACK codebook for HARQ-ACK information bits corresponding to TBs provided by a next PDSCH reception and then repeats step 1740. Alternatively, when the DAI value is incremented N, the UE, in step 1770, terminates the procedure for the N PDSCH receptions on the serving cell that are scheduled by the DCI format in the PDCCH monitoring occasion. The UE can continue the procedure for a cell with a next larger index, when any, for the PDCCH monitoring occasion or with a cell with the smallest index in a next PDCCH monitoring occasion, if any, for the reporting of the HARQ-ACK codebook in a PUCCH or a PUSCH.

In certain embodiments, when a UE (such as the UE 116) is configured to receive CBG-based PDSCH, a second DCI format used for scheduling multiple PDSCH receptions includes a CBGTI field for each PDSCH reception. That approach is functional but can substantially increase the payload/size of the second DCI format. For example, a size of a CBGTI field in a first DCI format used for scheduling only one PDSCH reception can be eight bits and, for a same CBG indication granularity, a size of the CBGTI field in the second DCI format scheduling up to $N_{PDSCH}^{max}=4$ PDSCH receptions is 32 bits.

In a first approach to mitigate the increase in the payload of the second DCI format, a different CBG granularity can be configured for the first and second DCI formats by providing separate configurations for the number of CBGs per TB. For example, a higher layer parameter maxCodeBlockGroupsPerTransportBlock can indicate a number of bits for the CBGTI field in the first DCI format and a higher layer parameter maxCodeBlockGroupsPerTransportBlock2 can indicate a number of bits for the CBGTI field in the second DCI format. For example, a value of maxCodeBlockGroupsPerTransportBlock can be four. Additionally, a value of maxCodeBlockGroupsPerTransportBlock2 can be two. It is also possible that CBG-based PDSCH reception is configured separately for the first and second DCI formats. For example, CBG-based PDSCH reception is not configured for the second DCI format, for example by not providing maxCodeBlockGroupsPerTransportBlock2, while CBG-based PDSCH reception is configured for the first DCI format. The UE constructs a HARQ-ACK codebook according to the configured number of CBGs per TB and the UE can provide a different number of HARQ-ACK information bits for a corresponding TB in a PDSCH reception that is scheduled by the first DCI format and for a corresponding TB in a PDSCH reception that is scheduled by the second DCI format.

The method 1800 of FIG. 18, describes an example procedure for a UE to determine a number of CBGs per TB depending on a DCI format that schedules a PDSCH reception.

In step 1810, a UE (such as the UE 116) receives a first configuration by higher layers for a first number of CBGs per TB in a PDSCH reception that is scheduled by a first DCI format used for scheduling only one PDSCH reception. Additionally, in step 1820, the UE also receives a second configuration by higher layers for a second number of CBGs per TB in a PDSCH reception that is scheduled by a second DCI format used for scheduling multiple PDSCH reception.

In step 1830, the UE determines whether a PDSCH reception is scheduled by the first DCI format or by the second DCI format. When the PDSCH reception is scheduled by the first DCI format, the UE, in step 1840, receives a TB according to the first number of CBGs per TB. When the PDSCH reception is scheduled by the second DCI format, the UE, in step 1850, receives a TB in a corresponding PDSCH reception according to the second number of CBGs per TB.

In a second approach, a number of CBGTI fields $N_{CBGTI}$ in the second DCI format can be smaller than $N_{PDSCH}^{max}$. A motivation is that a PDSCH reception is more likely to provide a new TB, as identified by a corresponding NDI value, and then a corresponding CBGTI is not needed. For example, for a TB block error rate (BLER) of 10%, it is almost 10 times more likely, on average, that a PDSCH reception by a UE includes a new TB than a previously received TB. A UE can be provided by higher layers from a serving gNB a value of $N_{CBGTI}$ in the second DCI format or $N_{CBGTI}$ can be specified in the system operation and can be a function of the $N_{PDSCH}$ value, such as for example, $N_{CBGTI}=1$ for $N_{PDSCH}^{max}=4$ and $N_{CBGTI}=2$ for $N_{PDSCH}^{max}=8$. Same as for a first DCI format used for scheduling only one PDSCH reception, when a PDSCH reception includes 2 TBs, the first half bits of the CBGTI field correspond to the first TB and the second half bits of the CBGTI field correspond to the second TB. When a UE receives $N_{reTx}$ PDSCHs, each providing a TB that the UE previously received as identified by values of corresponding NDI fields, and $N_{reTx}>N_{CBGTI}$, CBG-based retransmission can apply for the first $N_{CBGTI}$ of the $N_{reTx}$ PDSCH receptions and the remaining $N_{reTx}-N_{CBGTI}$ PDSCH receptions can include all CBGs of the corresponding TB. The second approach can also be combined with the first approach to further reduce a number of bits for CBGTI fields in the second DCI format and the number can be same as a number of bits for a CBGTI field in the first DCI format.

The method 1900 of FIG. 19, describes an example procedure for a UE to determine a number of CBGs per TB depending on a DCI format that schedules a PDSCH reception.

In step 1910, a UE (such as the UE 116) receives from a serving gNB (such as BS 102) by higher layers a configuration for a number of $N_{CBGTI}$ fields in a DCI format used for scheduling up to $N_{PDSCH}^{max}$ PDSCH receptions. In step 1220, the UE detects a DCI format scheduling $N_{PDSCH} \leq N_{PDSCH}^{max}$ PDSCH receptions.

Based on corresponding values of NDI fields in the DCI format, the UE determines, in step 1930, whether a number of $N_{reTx} \leq N_{PDSCH}$ PDSCH receptions, each providing a TB that the UE previously received, is larger than $N_{CBGTI}$. When $N_{reTx} \leq N_{CBGTI}$, the UE, in step 1940, receives the CBGs indicated by corresponding $N_{CBGTI}$ fields in the DCI format for the $N_{reTx}$ PDSCH receptions. Alternatively, when $N_{reTx} > N_{CBGTI}$, the UE, in step 1950, receives the CBGs indicated by corresponding $N_{CBGTI}$ fields in the DCI format for the first $N_{CBGTI}$ PDSCH reception of the $N_{reTx}$ PDSCH receptions and receives all CBGs (receives the TBs) in the remaining $N_{reTx} - N_{CBGTI}$ of the $N_{reTx}$ PDSCH receptions.

In certain embodiments, similar to the CBGTI field, when a UE is configured to receive CBG-based PDSCH, a first DCI format scheduling multiple PDSCH receptions needs to include a CBGFI field for each PDSCH reception. Therefore, as the CBGFI for a PDSCH includes one bit, a total of $N_{PDSCH}^{max}$ bits need to be added to the first DCI format. When a CBGTI field does not exist for a PDSCH reception scheduled by the first DCI format, a CBGFI field for the PDSCH reception can also be omitted.

Although FIG. 15 illustrates the method 1500, FIG. 16 illustrates the method 1600, FIG. 17 illustrates the method 1700, FIG. 18 illustrates the method 1800, and FIG. 19 illustrates the method 1900 various changes may be made to FIGS. 15-19. For example, while the methods 1500, 1600, 1700, 1800, and 1900 are shown as a series of steps, various steps could overlap, occur in parallel, occur in a different order, or occur multiple times. In another example, steps may be omitted or replaced by other steps. For example, steps of the method 1500 can be executed in a different order.

Embodiments of the present disclosure also describe using different DCI formats to schedule one and more than one PDSCH receptions. The following examples and embodiments, such as those of FIG. 20 describe using different DCI formats. For example, embodiments of this disclosure describe a use of a first DCI format for scheduling only one PDSCH reception and of a second DCI format for scheduling only more than one PDSCH receptions.

Figure 20:
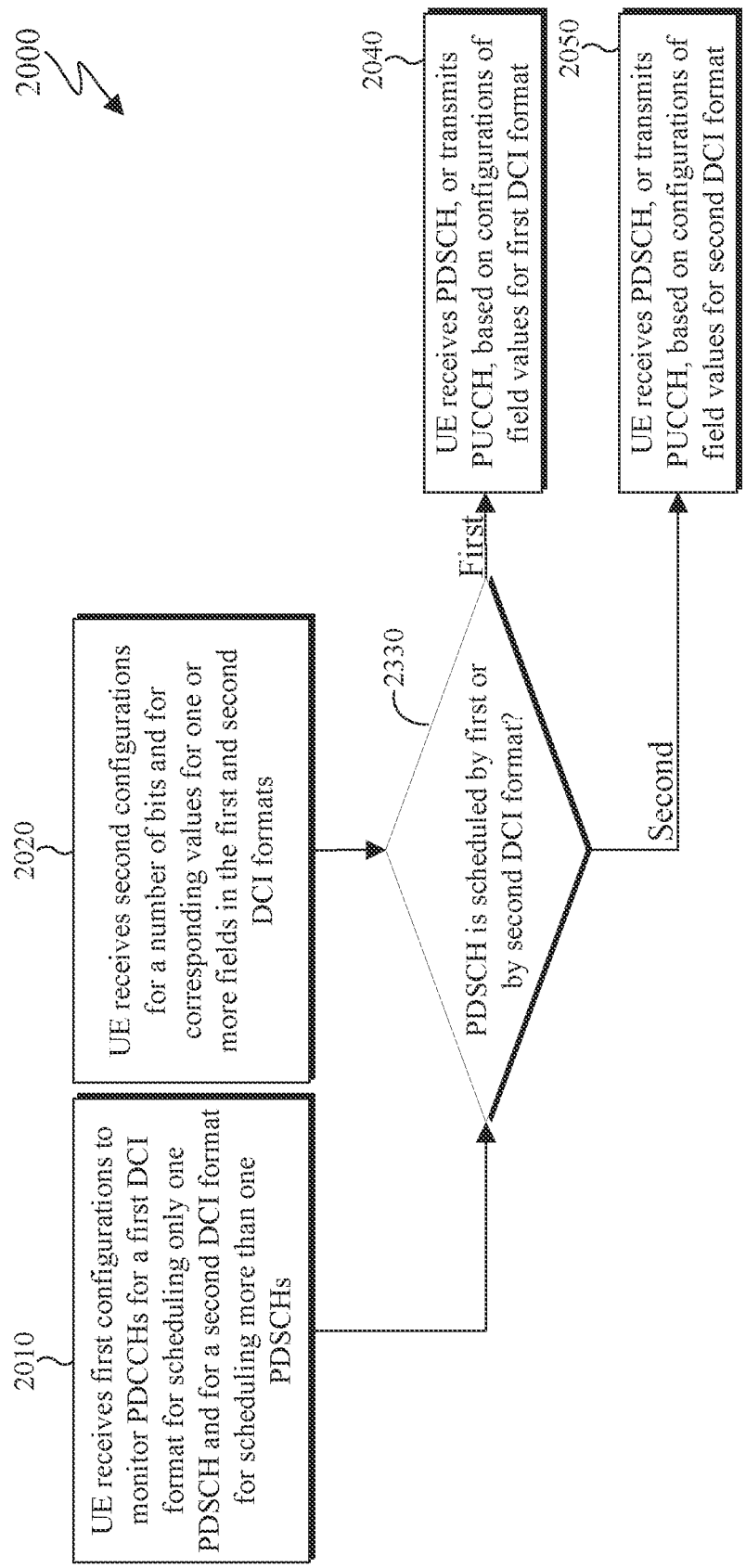
FIG. 20 illustrates an example method for a UE to receive one PDSCH scheduled by a first DCI format or receive more than one PDSCHs scheduled by a second DCI format according to embodiments of the present disclosure.

FIG. 20 illustrates an example method 2000 for a UE to receive one PDSCH scheduled by a first DCI format or receive more than one PDSCHs scheduled by a second DCI format according to embodiments of the present disclosure. The steps of the method 2000 can be performed by any of the UEs 111-119 of FIG. 1, such as the UE 116 of FIG. 3. The method 2000 is for illustration only and other embodiments can be used without departing from the scope of the present disclosure.

Embodiments of the present disclosure take into consideration that there are several motivations for using a first DCI format for scheduling only a single PDSCH reception and a second DCI format for scheduling only more than one PDSCH receptions. One motivation is to avoid an unnecessarily large size for the first DCI format size. For example, for scheduling a maximum of $N_{max}^{PDSCH}$ PDSCH receptions, wherein each PDSCH can include a maximum of 2 TBs, and assuming that a value range for a field is same in the first DCI format and in the second DCI format (same capability for the field in both DCI formats), a number of RV bits and a number of NDI bits in the second DCI format increase by a factor of $2 \cdot (N_{max}^{PDSCH} - 1)$. Considering the NDI field of one bit and 2 TBs per PDSCH, the increase in the payload of the second DCI format over the payload of the first DCI format is 12 bits in case of one RV bit and is 18 bits in case of two RV bits. Further, as described above, if there are more than one CBGTI or CBGFI, the payload of the second DCI format will further increase and the same holds for other fields such as the rate matching indicator field as described in the third embodiment of this disclosure.

Additionally, another motivation is that it can be beneficial for a network to limit applicability of certain functionalities only to the first DCI format, or only to the second DCI format, in order to avoid increasing a size of both DCI formats. For example, a network can configure a BWP indicator field in the first DCI format and not configure the BWP indicator field in the second DCI format. For example, the network can configure a SCell dormancy indication field in the first DCI format and not configure the SCell dormancy indication field in the second DCI format. In general, separate configurations for a number of bits of a field, or for a set of corresponding values, can apply for the first DCI format and for the second DCI format.

In certain embodiments, as the first DCI format schedules only one PDSCH reception, the TDRA field of the first DCI format does not need to indicate a number of PDSCH receptions. Conversely, as the second DCI format schedules more than one PDSCH receptions, the TDRA field of the second DCI format always indicates a number of PDSCH receptions, up to a predetermined or configured maximum number $N_{max}^{PDSCH}$ of PDSCH receptions.

For the FDRA field, as a use of the second DCI format can be associated with an objective to provide high DL data rates for the UE, a large bandwidth allocation can be typically expected, and a frequency allocation granularity can be coarser for the second DCI format than for the first DCI format. Therefore, for resource allocation type 0, the RBG size can be separately configured for the first DCI format and for the second DCI format and, for example, it can be larger for the second DCI format thereby reducing the size of the second DCI format.

For the PUCCH resource indicator field, a UE (such as the UE 116) can be provided first and second configurations of PUCCH resources for a PUCCH transmission with HARQ-ACK information associated with PDSCH receptions scheduled by the first and second DCI formats, respectively. For example, that can be beneficial in order for the first set to include more resources associated with smaller HARQ-ACK codebook sizes as the UE is likely to have fewer PDSCH receptions scheduled by the first DCI format than PDSCH receptions scheduled by the second DCI format.

The method 2000 of FIG. 20, describes an example procedure for a UE to receive one PDSCH scheduled by a first DCI format or to receive more than one PDSCHs scheduled by a second DCI format.

In step 2010, a UE (such as the UE 116) receives first configurations by higher layers from a serving gNB to monitor PDCCHs for a first DCI format used for scheduling only one PDSCH reception and for a second DCI format used for scheduling more than one PDSCH receptions. In step 2020, the UE also receives second configurations by higher layers for a number of bits and for corresponding values for one or more fields in the first and second DCI formats. The fields include a (i) TDRA field mapping to entries of a first and second TDRA table for the first and second DCI format, respectively, a (ii) FDRA field mapping to first and second RBG sizes for the first and second DCI formats, respectively, or (iii) a PUCCH resource allocation field mapping to first and second PUCCH resource sets for the first and second DCI formats, respectively.

In step 2030, the UE determines whether a PDSCH reception is scheduled by the first DCI format or by the second DCI format. When the PDSCH reception is scheduled by the first DCI format, the UE, in step 2040, receives the PDSCH, or transmits a PUCCH with associated HARQ-ACK information, according to the configurations of field values for the first DCI format. Alternatively, when the PDSCH reception is scheduled by the second DCI format, the UE, in step 2050, receives the PDSCH, or transmits a PUCCH with associated HARQ-ACK information, according to the configurations of field values for the second DCI format.

It is noted that by separately configuring a size of each field (including a size of zero bits for absence of the field), for the first and second DCI formats, it is possible for the first and second DCI formats to have a same size as some fields can have a larger number of bits in the first DCI format and some other fields can have a larger number of bits in the second DCI format. Then, the first and second DCI formats can include a 1-bit flag, or can use a different RNTI, for a UE to identify whether a detected DCI format of a predetermined size is the first DCI format or the second DCI format. For example, based on the value of the flag, the UE can determine whether a DCI format schedules one PDSCH reception or more than one PDSCH receptions and the UE can then apply a different interpretation to the remaining fields of the DCI format.

Although FIG. 20 illustrates the method 2000 various changes may be made to FIG. 20. For example, while the method 2000 is shown as a series of steps, various steps could overlap, occur in parallel, occur in a different order, or occur multiple times. In another example, steps may be omitted or replaced by other steps. For example, steps of the method 2000 can be executed in a different order.

Embodiments of the present disclosure also describe rate matching for multiple PDSCH receptions scheduled by a DCI format. The following examples and embodiments, such as those of FIG. 21 describe rate matching. For example, embodiments of this disclosure describe a rate matching procedure for multiple PDSCH receptions that are scheduled by a single DCI format.

Figure 21:
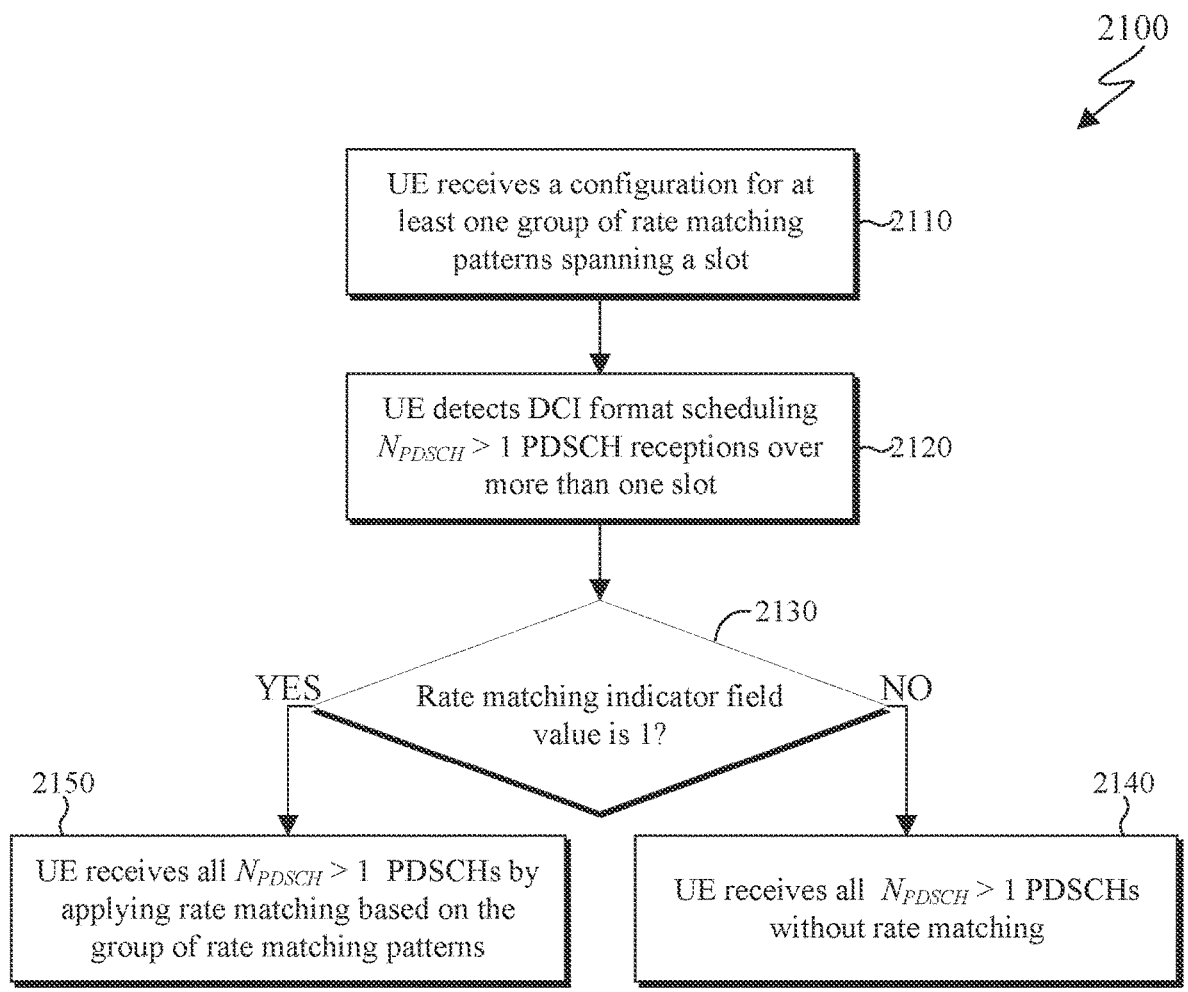
FIG. 21 illustrates an example method for a UE determining a rate matching pattern over more than one slots for PDSCH receptions over more than one slots according to embodiments of the present disclosure.

FIG. 21 illustrates an example method 2100 for a UE determining a rate matching pattern over more than one slots for PDSCH receptions over more than one slots according to embodiments of the present disclosure. The steps of the method 2100 can be performed by any of the UEs 111-119 of FIG. 1, such as the UE 116 of FIG. 3. The method 2100 is for illustration only and other embodiments can be used without departing from the scope of the present disclosure.

In certain embodiments, a UE is provided by higher layers from a serving gNB one or two groups of rate matching patterns. A rate matching pattern is defined by a bitmap over a set of time-frequency resources, wherein the resources are over a number of symbols, such as 14 or 28 symbols, and a number of RBs, such as 275 RBs, and repeat with a configured periodicity, such as 2 slots or 10 slots. A bitmap indicates elements of the time-frequency resources that are available (or unavailable) for receptions. A rate matching pattern is defined by a bitmap. In addition to the set of time-frequency resources a rate matching pattern can include a CORESET. A DCI format scheduling a PDSCH reception can include a rate matching indicator field with one or two bits, for respective one or two groups of rate matching patterns. In certain embodiments, a value of one of the rate matching indicator field for a respective group of rate matching patterns indicates that the UE does not receive PDSCH in symbols and RBs included in a rate matching pattern from the group of rate matching patterns.

In a first approach for a DCI format scheduling up to $N_{PDSCH}^{max}$ PDSCH receptions, a number of bits for a rate matching indicator field needs to increase by a factor of $N_{PDSCH}^{max}$ in order to provide a rate matching indication for each of the $N_{PDSCH}^{max}$ PDSCH receptions (regardless of whether or not the DCI format schedules $N_{PDSCH} \leq N_{PDSCH}^{max}$ PDSCH receptions). That approach also requires a network to predict a rate matching that would be required for PDSCH receptions in subsequent slots, possibly also including availability for PDSCH reception of time-frequency resources configured for a CORESET.

In a second approach for a DCI format scheduling up to $N_{PDSCH}^{max}$ PDSCH receptions by a UE, a number of bits for a rate matching indicator field remains one or two, for example as configured for a DCI format scheduling only one PDSCH reception or separately configured for the DCI format scheduling up to $N_{PDSCH}^{max}$ PDSCH receptions. The UE applies a same rate matching pattern (that can also include CORESETs) as the one determined by the DCI format across all slots that include PDSCH receptions that are scheduled by the DCI format.

The method 2100 of FIG. 21, describes an example procedure for a UE to determine a rate matching pattern over more than one slots for PDSCH receptions over the more than one slots.

In step 2110, a UE (such as the UE 116) receives from a serving gNB by higher layer signaling a configuration for at least one group of rate matching patterns that span a slot (or two slots). In step 2120, the UE detects a DCI format scheduling $N_{PDSCH}>1$ PDSCH receptions over corresponding slots, such as $N_{PDSCH}>1$ slots, wherein the number of slots is larger than a number of slots included in any of the rate matching patterns such as one slot.

In step 2130, the UE determines whether to apply rate matching according to the group of rate matching patterns for a PDSCH reception in a slot based on a value of a rate matching indicator field in the DCI format. When the UE determines to not apply rate matching to a PDSCH reception in a slot, the UE, in step 2140, receives all $N_{PDSCH}>1$ PDSCHs in all corresponding slots without applying a corresponding rate matching. Alternatively, when the UE determines to apply rate matching to a PDSCH reception in a slot, the UE, in step 2150, receives all $N_{PDSCH}>1$ PDSCH receptions in all corresponding slots according to the rate matching.

In addition to rate matching of $N_{PDSCH}>1$ first PDSCH receptions by a UE (according to rate matching patterns or CORESETs, based on a value of a rate matching indicator field in a first DCI format in a first PDCCH reception that schedules the $N_{PDSCH}>1$ PDSCH receptions), rate matching can occur due to the UE detecting a second DCI format in a second PDCCH reception that is later that the first PDCCH reception and schedules a second PDSCH reception that overlaps in time-frequency resources with one or more of the first PDSCH receptions.

For example, the first and second DCI formats can include a priority indicator field indicating a priority value for the HARQ-ACK information, or for the PUCCH transmission with the HARQ-ACK information, associated with the first and second PDSCH receptions. When the value of the priority indicator field in the second DCI format is larger than in the first DCI format, the UE does not receive any PDSCH from the first PDSCHs that overlaps in time-frequency resources with the second PDSCH. The overlapping can be only in time, without requiring overlapping in frequency, when the UE cannot receive more than one PDSCH at a given time, for example based on a UE capability that the UE can also indicate to the serving gNB; otherwise, the overlapping can be in both time and frequency domains. The UE may drop reception of an overlapped PDSCH from the first PDSCHs in all remaining symbols and receive the second PDSCH, or the UE may drop reception of an overlapped PDSCH from the first PDSCHs only in the overlapped time or in the overlapped time-frequency resources.

For another example, if the first and second DCI formats do not include (i) a priority indicator field or (ii) a priority indicator field with same value, then the UE prioritizes reception of the PDSCH reception scheduled by a DCI format in a later PDCCH reception, and follows the behavior described in the first example.

Although FIG. 21 illustrates the method 2100 various changes may be made to FIG. 21. For example, while the method 2100 is shown as a series of steps, various steps could overlap, occur in parallel, occur in a different order, or occur multiple times. In another example, steps may be omitted or replaced by other steps. For example, steps of the method 2100 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for providing hybrid automatic repeat request acknowledgement (HARQ-ACK) information, the method comprising:
    receiving:
        information for a first HARQ-ACK codebook type and a second HARQ-ACK codebook type, and
        information for a first set of cells and a second set of cells;
    generating:
        a first HARQ-ACK codebook, according to the first HARQ-ACK codebook type, that includes first HARQ-ACK information associated with first receptions on cells from the first set of cells,
        a second HARQ-ACK codebook, according to the second HARQ-ACK codebook type, that includes second HARQ-ACK information associated with second receptions on cells from the second set of cells, and
        a HARQ-ACK codebook by appending the second HARQ-ACK codebook to the first HARQ-ACK codebook; and
    transmitting a channel that provides the HARQ-ACK codebook.

2. The method of claim 1, further comprising:
    receiving an indication to change an active bandwidth part (BWP) of a cell, from the first set of cells, to a dormant BWP,
    wherein generating the first HARQ-ACK codebook further comprises generating the first HARQ-ACK codebook by excluding the cell from the first set of cells.

3. The method of claim 1, further comprising:
    receiving control information that includes a field with value indicating a subset of cells from the first set of cells,
    wherein generating the first HARQ-ACK codebook comprises generating the first HARQ-ACK codebook by excluding the subset of cells.

4. The method of claim 1, further comprising:
    receiving a downlink control information (DCI) format scheduling a reception of a physical downlink shared channel (PDSCH), wherein:
        the DCI format includes a downlink assignment indication (DAI) field when the PDSCH reception is on a cell from the second set of cells, and
        the DCI format do1es not include the DAI field when the PDSCH reception is on a cell from the first set of cells.

5. The method of claim 1, wherein:
    the second HARQ-ACK codebook includes more than one HARQ-ACK sub-codebooks; and
    the more than one HARQ-ACK sub-codebooks are associated with respective more than one subsets of cells from the second set of cells.

6. The method of claim 1, further comprising:
    receiving:
        a downlink control information (DCI) format scheduling reception of a number of physical downlink control channels (PDCCHs) over a respective number of slots on a cell from the first set of cells or from the second set of cells,
        one of the PDCCHs when the number of slots is one; and
        only PDSCHs that do not include uplink symbols in respective slots when the number of slots is more than one.

7. The method of claim 1, further comprising:
    receiving:
        a downlink control information (DCI) format scheduling reception of a number of physical downlink control channels (PDCCHs) over a respective number of slots on a cell from the first set of cells or from the second set of cells, wherein the DCI format includes a field indicating a rate matching pattern; and
        the number of PDCCHs according to the rate matching pattern in every slot from the number of slots.

8. A user equipment (UE) comprising:
    a transceiver configured to receive:
        information for a first hybrid automatic repeat request acknowledgement (HARQ-ACK) codebook type and a second HARQ-ACK codebook type, and
        information for a first set of cells and a second set of cells; and
    a processor operably coupled to the transceiver, the processor configured to generate:
        a first HARQ-ACK codebook, according to the first HARQ-ACK codebook type, that includes first HARQ-ACK information associated with first receptions on cells from the first set of cells,
        a second HARQ-ACK codebook, according to the second HARQ-ACK codebook type, that includes second HARQ-ACK information associated with second receptions on cells from the second set of cells, and a HARQ-ACK codebook by appending the second HARQ-ACK codebook to the first HARQ-ACK codebook, wherein the transceiver is further configured to transmit a channel that provides the HARQ-ACK codebook.

9. The UE of claim 8, wherein:

the transceiver is further configured to receive an indication to change an active bandwidth part (BWP) of a cell, from the first set of cells, to a dormant BWP; and the processor is further configured to generate the first HARQ-ACK codebook by excluding the cell from the first set of cells.

10. The UE of claim 8, wherein:

the transceiver is further configured to receive control information that includes a field with value indicating a subset of cells from the first set of cells; and the processor is further configured to generate the first HARQ-ACK codebook by excluding the subset of cells.

11. The UE of claim 8, wherein:

the transceiver is further configured to receive a downlink control information (DCI) format scheduling a reception of a physical downlink shared channel (PDSCH), the DCI format includes a downlink assignment indication (DAI) field when the PDSCH reception is on a cell from the second set of cells, and the DCI format does not include the DAI field when the PDSCH reception is on a cell from the first set of cells.

12. The UE of claim 8, wherein:

the second HARQ-ACK codebook includes more than one HARQ-ACK sub-codebooks; and the more than one HARQ-ACK sub-codebooks are associated with respective more than one subsets of cells from the second set of cells.

13. The UE of claim 8, wherein the transceiver is further configured to receive:

a downlink control information (DCI) format scheduling reception of a number of physical downlink control channels (PDCCHs) over a respective number of slots on a cell from the first set of cells or from the second set of cells, one of the PDCCHs when the number of slots is one; and only PDSCHs that do not include uplink symbols in respective slots when the number of slots is more than one.

14. The UE of claim 8, wherein the transceiver is further configured to receive:

a downlink control information (DCI) format scheduling reception of a number of physical downlink control channels (PDCCHs) over a respective number of slots on a cell from the first set of cells or from the second set of cells, wherein the DCI format includes a field indicating a rate matching pattern; and the number of PDCCHs according to the rate matching pattern in every slot from the number of slots.

15. A base station comprising:

a transceiver configured to:

transmit:

information for a first hybrid automatic repeat request acknowledgement (HARQ-ACK) codebook type and a second HARQ-ACK codebook type, and information for a first set of cells and a second set of cells; and receive a channel that provides a HARQ-ACK codebook; and a processor operably coupled to the transceiver, the processor configured to identify from the HARQ-ACK codebook:

a first HARQ-ACK codebook, according to the first HARQ-ACK codebook type, that includes first HARQ-ACK information associated with first transmissions on cells from the first set of cells, and a second HARQ-ACK codebook, according to the second HARQ-ACK codebook type, that includes second HARQ-ACK information associated with second transmissions on cells from the second set of cells.

16. The base station of claim 15, wherein:

the transceiver is further configured to transmit an indication to change an active bandwidth part (BWP) of a cell, from the first set of cells, to a dormant BWP; and the processor is further configured to identify the first HARQ-ACK codebook by excluding the cell from the first set of cells.

17. The base station of claim 15, wherein:

the transceiver is further configured to transmit control information that includes a field with value indicating a subset of cells from the first set of cells; and the processor is further configured to identify the first HARQ-ACK codebook by excluding the subset of cells.

18. The base station of claim 15, wherein:

the transceiver is further configured to transmit a downlink control information (DCI) format scheduling a transmission of a physical downlink shared channel (PDSCH), the DCI format includes a downlink assignment indication (DAI) field when the PDSCH reception is on a cell from the second set of cells, and the DCI format does not include the DAI field when the PDSCH reception is on a cell from the first set of cells.

19. The base station of claim 15, wherein:

the second HARQ-ACK codebook includes more than one HARQ-ACK sub-codebooks; and the more than one HARQ-ACK sub-codebooks are associated with respective more than one subsets of cells from the second set of cells.

20. The base station of claim 15, wherein the transceiver is further configured to transmit:

a downlink control information (DCI) format scheduling transmission of a number of physical downlink control channels (PDCCHs) over a respective number of slots on a cell from the first set of cells or from the second set of cells, wherein the DCI format includes a field indicating a rate matching pattern; and the number of PDCCHs according to the rate matching pattern in every slot from the number of slots.

* * * * *